United States Patent
Fukudome

(10) Patent No.: US 8,817,302 B2
(45) Date of Patent: Aug. 26, 2014

(54) PRINTING SYSTEM, IMAGE FORMING APPARATUS, IMAGE FORMING METHOD, AND NON-TRANSITORY COMPUTER-READABLE RECORDING MEDIUM ENCODED WITH IMAGE FORMING PROGRAM FOR FACILITATING REGISTRATION OF A USER

(75) Inventor: Kenji Fukudome, Kawabe-gun (JP)

(73) Assignee: Konica Minolta Business Technologies, Inc., Chiyoda-Ku, Tokyo (JP), \

( * ) Notice: Subject to any disclaimer, the term of this patent is extended or adjusted under 35 U.S.C. 154(b) by 332 days.

(21) Appl. No.: 13/314,608

(22) Filed: Dec. 8, 2011

(65) Prior Publication Data

US 2012/0154848 A1 Jun. 21, 2012

(30) Foreign Application Priority Data

Dec. 16, 2010 (JP) ................. 2010-281002

(51) Int. Cl.
*G06F 15/00* (2006.01)
*G06K 1/00* (2006.01)
*G06F 3/12* (2006.01)

(52) U.S. Cl.
USPC .......................... 358/1.15; 358/1.13; 358/1.9

(58) Field of Classification Search
None
See application file for complete search history.

(56) References Cited

U.S. PATENT DOCUMENTS

| | | | | |
|---|---|---|---|---|
| 2002/0062453 A1* | 5/2002 | Koga | ........................ | 713/202 |
| 2003/0135549 A1* | 7/2003 | Kuno et al. | .................. | 709/203 |
| 2004/0054962 A1* | 3/2004 | Shima et al. | ................ | 715/500 |
| 2005/0154582 A1* | 7/2005 | Kortenoeven et al. | ........ | 704/200 |
| 2006/0165456 A1* | 7/2006 | Matsunaga et al. | ............ | 400/62 |
| 2006/0290967 A1* | 12/2006 | Sumitomo et al. | .......... | 358/1.14 |
| 2007/0268512 A1 | 11/2007 | Sakakibara | | |
| 2009/0033990 A1* | 2/2009 | Matsugashita | ............... | 358/1.15 |
| 2009/0207438 A1* | 8/2009 | Fujita | .......................... | 358/1.15 |
| 2009/0310172 A1 | 12/2009 | Miyamoto | | |
| 2010/0134822 A1* | 6/2010 | Kimura et al. | ............... | 358/1.14 |
| 2010/0208287 A1* | 8/2010 | Hanaoka et al. | ............. | 358/1.15 |

FOREIGN PATENT DOCUMENTS

| | | |
|---|---|---|
| JP | 2002-268854 A | 9/2002 |
| JP | 2007-094821 A | 4/2007 |
| JP | 2007-310722 A | 11/2007 |
| JP | 2009-303008 A | 12/2009 |

OTHER PUBLICATIONS

Office Action (Notice of Ground of Rejection) dated Dec. 4, 2012, issued in corresponding Japanese Patent Application No. 2010-281002, and an English Translation thereof. (6 pages).

* cited by examiner

*Primary Examiner* — Ming Hon
(74) *Attorney, Agent, or Firm* — Buchanan Ingersoll & Rooney PC

(57) ABSTRACT

The print server includes: a registration portion to register the image forming apparatus; a spool portion to store a set of print data and user identification information; a virtual data transmitting portion, and a print data transmitting portion. The registered image forming apparatus includes: a distribution control portion to cause the image forming portion to form an image of the print data, and store the received set, and further, when the virtual data is received, store the received virtual data; an authenticated printing portion to, cause the image forming portion to form an image of print data that makes a pair with the user identification information of the authenticated user; and an acquisition request transmitting portion to transmit an acquisition request to the print server.

14 Claims, 14 Drawing Sheets

F I G. 2
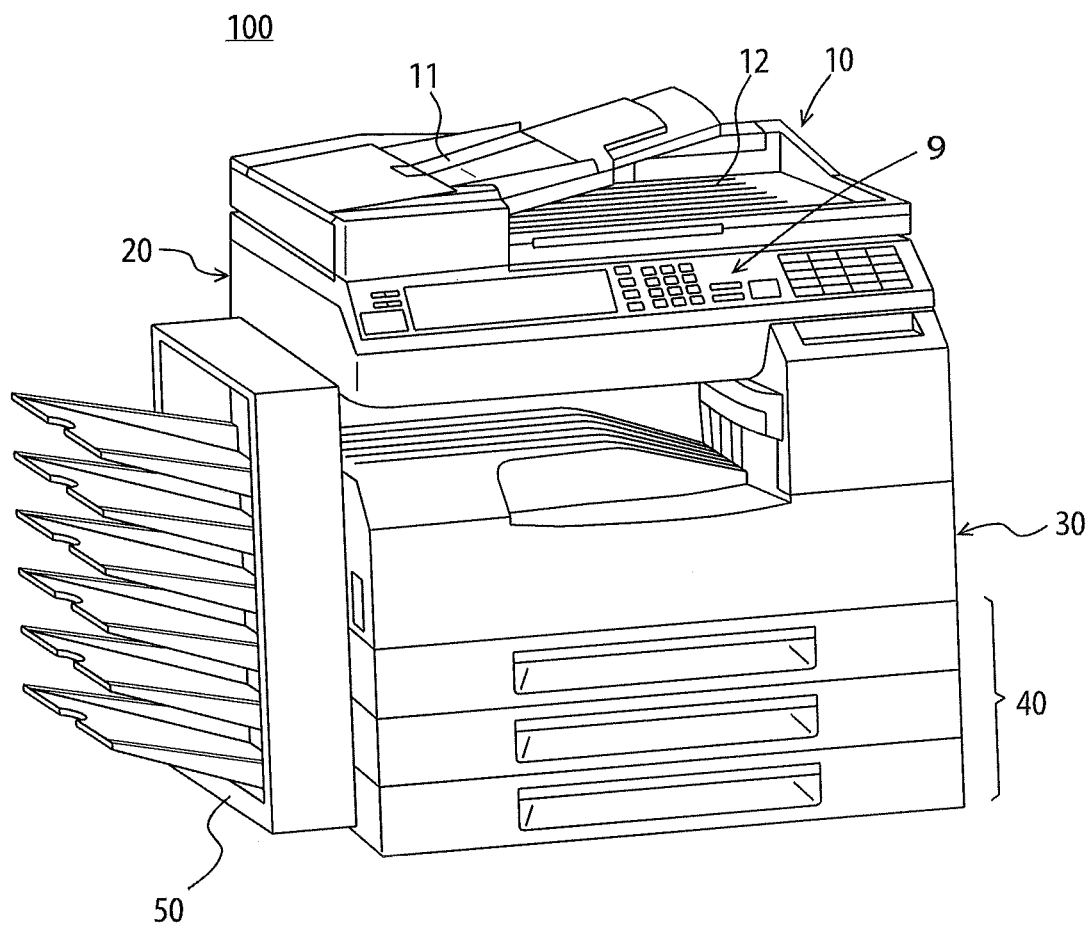

F I G. 4
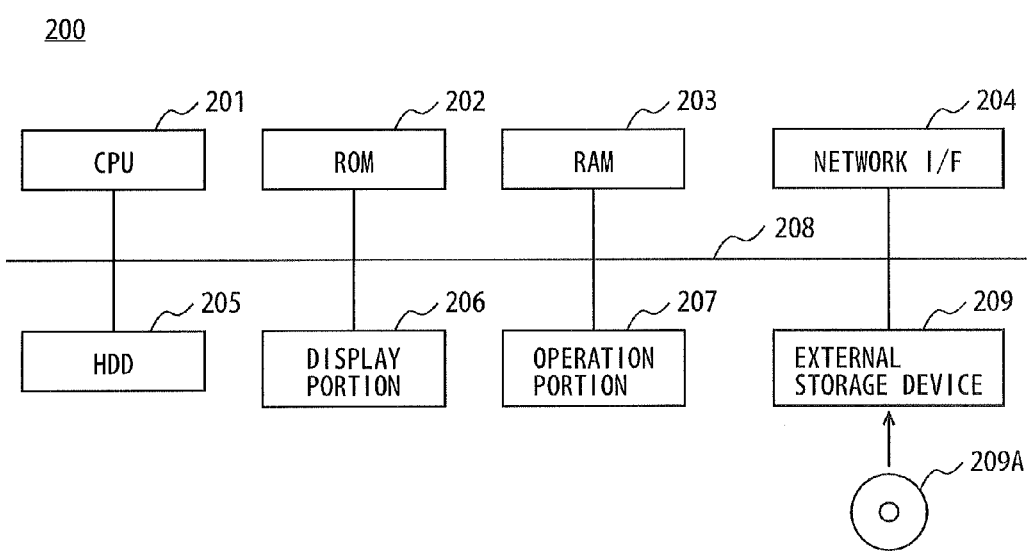

F I G. 6
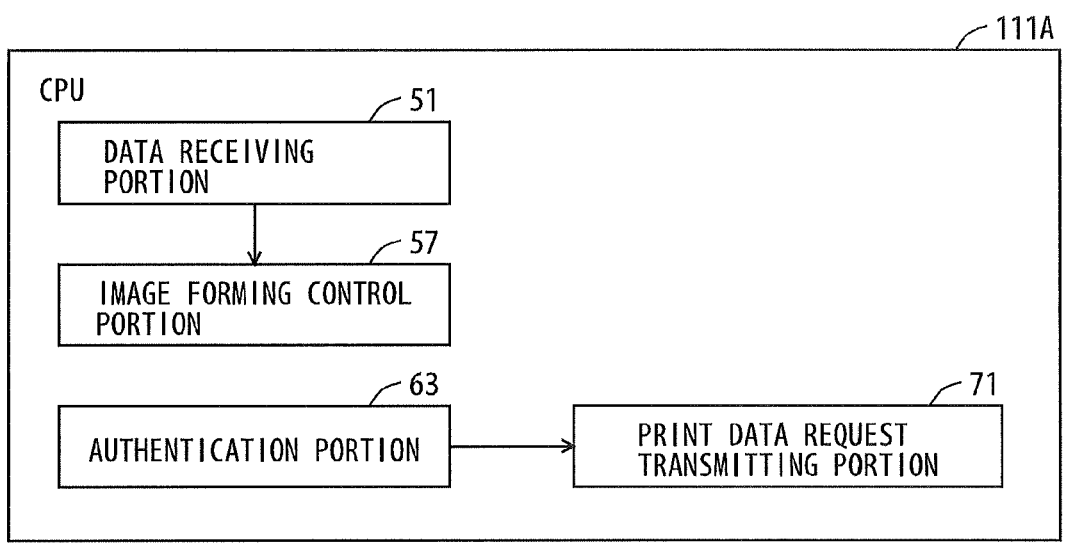

PRINTING SYSTEM, IMAGE FORMING APPARATUS, IMAGE FORMING METHOD, AND NON-TRANSITORY COMPUTER-READABLE RECORDING MEDIUM ENCODED WITH IMAGE FORMING PROGRAM FOR FACILITATING REGISTRATION OF A USER

This application is based on Japanese Patent Application No. 2010-281002 filed with Japan Patent Office on Dec. 16, 2010, the entire content of which is hereby incorporated by reference.

BACKGROUND OF THE INVENTION

1. Field of the Invention

The present invention relates to a printing system, an image forming apparatus, an image forming method, and a non-transitory computer-readable recording medium encoded with an image forming program. More particularly, the present invention relates to a printing system which includes a print server and an image forming apparatus that performs pull printing of print data stored in the print server, the image forming apparatus, an image forming method performed in the image forming apparatus, and a non-transitory computer-readable recording medium encoded with an image forming program.

2. Description of the Related Art

A printing system is known in which when print data is transmitted from a personal computer (hereinafter, also referred to as a "PC"), an image forming apparatus represented by a multi-function peripheral is caused to print the print data at the time when a user logs in to the image forming apparatus, rather than printing the same immediately. There are two types of printing methods performed in this printing system. One involves an authenticated printing system made up of a personal computer and an image forming apparatus, and the other involves a pull printing system made up of a personal computer, an image forming apparatus, and a print server.

In the authenticated printing system, a PC transmits print data and user identification information to an image forming apparatus, and the image forming apparatus stores the print data and the user identification information temporarily. Thereafter, when the user logs in to the image forming apparatus, the image forming apparatus forms an image of the print data that is stored together with the user identification information of the logged-in user.

On the other hand, in the pull printing system, a PC transmits user identification information and print data to a print server, and the print server temporarily stores the user identification information and the print data in association with each other. Thereafter, when the user logs in to an image forming apparatus, the image forming apparatus transmits to the print server a transmission request including the user identification information of the logged-in user. When the print server receives the transmission request from the image forming apparatus, the print server extracts, from the temporarily stored print data, the print data associated with the same user identification information as that included in the transmission request, and returns the extracted print data as well as the user identification information to the image forming apparatus. When the image forming apparatus receives the print data and the user identification information from the print server, the image forming apparatus forms an image of the print data.

In the authenticated printing system, after a user is authenticated, the print data that is temporarily stored at the time of the authentication is printed. In the pull printing system, after a user is authenticated, a transmission request is transmitted to a print server. Therefore, in order to make a single image forming apparatus correspond to both of the authenticated printing system and the pull printing system, it is necessary to authenticate a user for each of the systems. Specifically, when an image forming apparatus which corresponds to the authenticated printing system receives print data and user identification information from the outside, the image forming apparatus stores them temporarily. If this image forming apparatus is applied to the pull printing system, the image forming apparatus will temporarily store the print data and the user identification information that are received from the print server after the transmission request is transmitted to the print server following the authentication of the user. Then, in order for this temporarily stored print data to be printed, the user authentication needs to be performed again.

SUMMARY OF THE INVENTION

According to an aspect of the present invention, there is provided a printing system including an image forming apparatus and a print server, wherein the print server includes: a registration portion configured to register the image forming apparatus; a spool portion configured to, in the case where a set of print data and user identification information is received from the outside, store the received set of print data and user identification information into a server-side storing portion; a virtual data transmitting portion configured to, in response to an event that the set of print data and user identification information is stored into the server-side storing portion, transmit virtual data to the registered image forming apparatus, the virtual data including at least print data identification information for identifying the stored print data and the user identification information making a pair with the stored print data; and a print data transmitting portion configured to, in response to an event that an acquisition request including the print data identification information is received from the registered image forming apparatus, in the case where print data specified by the print data identification information is stored in the server-side storing portion, transmit the print data to the image forming apparatus that issued the acquisition request, and wherein the registered image forming apparatus includes: an authentication portion configured to authenticate a user; a print data receiving portion configured to receive print data from the outside; an image forming portion configured to form an image of print data received from the outside; a distribution control portion configured to, in the case where print data is received from the outside, cause the image forming portion to form an image of the received print data, and, in the case where a set of print data and user identification information is received from the outside, store the received set of print data and user identification information into an authenticated printing data storing portion, while prohibiting the image forming portion from forming an image of the received print data, and further, in the case where the virtual data is received from the print server, store the received virtual data into the authenticated printing data storing portion; an authenticated printing portion configured to, in response to an event that a user is authenticated by the authentication portion, cause the image forming portion to form an image of print data that is stored in the authenticated printing data storing portion at the time of the authentication of the user by the authentication portion and that makes a pair with the user identification information of the authenticated user; and an acquisition request transmitting portion configured to, in the case where the virtual data including the user identification information of the authenticated user is stored in the authenticated printing data storing portion at the time of the authentication of the user by the authentication portion, transmit an acquisition request including the print data identification information included in the virtual data to the print server.

According to another aspect of the present invention, there is provided an image forming apparatus capable of communicating with a print server, the print server including a registration portion configured to register the image forming apparatus, a spool portion configured to, in the case where a set of print data and user identification information is received from the outside, store the received set of print data and user identification information into a server-side storing portion, a virtual data transmitting portion configured to, in response to an event that the set of print data and user identification information is stored into the server-side storing portion, transmit virtual data to the registered image forming apparatus, the virtual data including at least print data identification information for identifying the stored print data and the user identification information making a pair with the stored print data, and a print data transmitting portion configured to, in response to an event that an acquisition request including the print data identification information is received from the registered image forming apparatus, in the case where print data specified by the print data identification information is stored in the server-side storing portion, transmit the print data to the image forming apparatus that issued the acquisition request, wherein the image forming apparatus includes: an authentication portion configured to authenticate a user; a print data receiving portion configured to receive print data from the outside; an image forming portion configured to form an image of print data; a distribution control portion configured to, in the case where print data is received from the outside, cause the image forming portion to form an image of the received print data, and, in the case where a set of print data and user identification information is received from the outside, store the received set of print data and user identification information into an authenticated printing data storing portion, while prohibiting the image forming portion from forming an image of the received print data, and further, in the case where the virtual data is received from the print server, store the received virtual data into the authenticated printing data storing portion; an authenticated printing portion configured to, in response to an event that a user is authenticated by the authentication portion, cause the image forming portion to form an image of print data that is stored in the authenticated printing data storing portion at the time of the authentication of the user by the authentication portion and that makes a pair with the user identification information of the authenticated user; and an acquisition request transmitting portion configured to, in the case where the virtual data including the user identification information of the authenticated user is stored in the authenticated printing data storing portion at the time of the authentication of the user by the authentication portion, transmit an acquisition request including the print data identification information included in the virtual data to the print server.

According to a further aspect of the present invention, there is provided an image forming method performed by an image forming apparatus capable of communicating with a print server, the print server including a registration portion configured to register the image forming apparatus, a spool portion configured to, in the case where a set of print data and user identification information is received from the outside, store the received set of print data and user identification information into a server-side storing portion, a virtual data transmitting portion configured to, in response to an event that the set of print data and user identification information is stored into the server-side storing portion, transmit virtual data to the registered image forming apparatus, the virtual data including at least print data identification information for identifying the stored print data and the user identification information making a pair with the stored print data, and a print data transmitting portion configured to, in response to an event that an acquisition request including the print data identification information is received from the registered image forming apparatus, in the case where print data specified by the print data identification information is stored in the server-side storing portion, transmit the print data to the image forming apparatus that issued the acquisition request, the image forming apparatus including an authenticated printing data storing portion configured to store data, and an image forming portion configured to form an image of print data received from the outside, wherein the method includes: an authentication step of authenticating a user; a distribution controlling step of, in the case where print data is received from the outside, causing the image forming portion to form an image of the received print data, and, in the case where a set of print data and user identification information is received from the outside, storing the received set of print data and user identification information into the authenticated printing data storing portion, while prohibiting the image forming portion from forming an image of the received print data, and further, in the case where the virtual data is received from the print server, storing the received virtual data into the authenticated printing data storing portion; an authenticated printing step of, in response to an event that a user is authenticated in the authentication step, causing the image forming portion to form an image of print data that is stored in the authenticated printing data storing portion at the time of the authentication of the user in the authentication step and that makes a pair with the user identification information of the authenticated user; and an acquisition requesting step of, in the case where the virtual data including the user identification information of the authenticated user is stored in the authenticated printing data storing portion at the time of the authentication of the user in the authentication step, transmitting an acquisition request including the print data identification information included in the virtual data to the print server.

According to a still further aspect of the present invention, there is provided a non-transitory computer-readable recording medium encoded with an image forming program performed by a computer, the computer being configured to control an image forming apparatus capable of communicating with a print server, the print server including a registration portion configured to register the image forming apparatus, a spool portion configured to, in the case where a set of print data and user identification information is received from the outside, store the received set of print data and user identification information into a server-side storing portion, a virtual data transmitting portion configured to, in response to an event that the set of print data and user identification information is stored into the server-side storing portion, transmit virtual data to the registered image forming apparatus, the virtual data including at least print data identification information for identifying the stored print data and the user identification information making a pair with the stored print data, and a print data transmitting portion configured to, in response to an event that an acquisition request including the print data identification information is received from the registered image forming apparatus, in the case where print data specified by the print data identification information is stored in the server-side storing portion, transmit the print data to the image forming apparatus that issued the acquisition request, the image forming apparatus including an authenticated printing data storing portion configured to store data, and an image forming portion configured to form an image of print data received from the outside, wherein the program causes the computer to execute processing including: an authentication step of authenticating a user; a distribution controlling step of, in the case where print data is received from the outside, causing the image forming portion to form an image of the received print data, and, in the case where a set of print data and user identification information is received from the outside, storing the received set of print data and user identification information into the authenticated printing data storing portion, while prohibiting the image forming portion from forming an image of the received print data, and further, in the case where the virtual data is received from the print server, storing the received virtual data into the authenticated printing data storing portion; an authenticated printing step of, in response to an event that a user is authenticated in the authentication step, causing the image forming portion to form an image of print data that is stored in the authenticated printing data storing portion at the time of the authentication of the user in the authentication step and that makes a pair with the user identification information of the authenticated user; and an acquisition requesting step of, in the case where the virtual data including the user identification information of the authenticated user is stored in the authenticated printing data storing portion at the time of the authentication of the user in the authentication step, transmitting an acquisition request including the print data identification information included in the virtual data to the print server.

According to yet another aspect of the present invention, there is provided a printing system including an image forming apparatus and a print server, wherein the print server includes: a spool portion configured to, in the case where a set of print data and user identification information is received from the outside, store the received set of print data and user identification information into a server-side storing portion; and a print data transmitting portion configured to, in response to an event that a print data request is received from the image forming apparatus, in the case where print data that makes a pair with the user identification information included in the received print data request is stored in the server-side storing portion, transmit a set of the print data and the user identification information to the image forming apparatus that issued the print data request, and wherein the image forming apparatus includes: an authentication portion configured to authenticate a user; a print data requesting portion configured to, in response to an event that a user is authenticated by the authentication portion, transmit a print data request including the user identification information of the authenticated user to the print server; a print data receiving portion configured to receive print data from the outside; an image forming portion configured to form an image of print data received from the outside; a distribution control portion configured to, in the case where print data is received from the outside, cause the image forming portion to form an image of the received print data, and, in the case where a set of print data and user identification information is received from the outside, store the received set of print data and user identification information into an authenticated printing data storing portion, while prohibiting the image forming portion from forming an image of the received print data; an authenticated printing portion configured to, in response to an event that a user is authenticated by the authentication portion, cause the image forming portion to form an image of print data that is stored in the authenticated printing data storing portion at the time of the authentication of the user by the authentication portion and that makes a pair with the user identification information of the authenticated user; a print data erasing portion configured to, after an image of the print data is formed by the image forming portion, erase the print data, the image of which has been formed, from the authenticated printing data storing portion; and a logged-in printing portion configured to, in the case where print data that makes a pair with the user identification information of the authenticated user is stored in the authenticated printing data storing portion during a period in which the login of the user authenticated by the authentication portion is valid, cause the image forming portion to form an image of the print data.

According to yet another aspect of the present invention, there is provided an image forming apparatus capable of communicating with a print server, the print server including a spool portion configured to, in the case where a set of print data and user identification information is received from the outside, store the received set of print data and user identification information into a server-side storing portion, and a print data transmitting portion configured to, in response to an event that a print data request is received from the image forming apparatus, in the case where print data that makes a pair with the user identification information included in the received print data request is stored in the server-side storing portion, transmit a set of the print data and the user identification information to the image forming apparatus that issued the print data request, wherein the image forming apparatus includes: an authentication portion configured to authenticate a user; a print data receiving portion configured to receive print data from the outside; an image forming portion configured to form an image; a distribution control portion configured to, in the case where print data is received from the outside, cause the image forming portion to form an image of the received print data, and, in the case where a set of print data and user identification information is received from the outside, store the received set of print data and user identification information into an authenticated printing data storing portion, while prohibiting the image forming portion from forming an image of the received print data; an authenticated printing portion configured to, in response to an event that a user is authenticated by the authentication portion, cause the image forming portion to form an image of print data that is stored in the authenticated printing data storing portion at the time of the authentication of the user by the authentication portion and that makes a pair with the user identification information of the authenticated user; a print data erasing portion configured to, after an image of the print data is formed by the image forming portion, erase the print data, the image of which has been formed, from the authenticated printing data storing portion; and a logged-in printing portion configured to, in the case where print data that makes a pair with the user identification information of the authenticated user is stored in the authenticated printing data storing portion during a period in which the login of the user authenticated by the authentication portion is valid, cause the image forming portion to form an image of the print data.

According to yet another aspect of the present invention, there is provided an image forming method performed by an image forming apparatus capable of communicating with a print server, the print server including a spool portion configured to, in the case where a set of print data and user identification information is received from the outside, store the received set of print data and user identification information into a server-side storing portion, and a print data transmitting portion configured to, in response to an event that a print data request is received from the image forming apparatus, in the case where print data that makes a pair with the user identification information included in the received print data request is stored in the server-side storing portion, transmit a set of the print data and the user identification information to the image forming apparatus that issued the print data request, the image forming apparatus including an authenticated printing data storing portion configured to store data, and an image forming portion configured to form an image, wherein the method includes: an authentication step of authenticating a user; a print data receiving step of receiving print data from the outside; a distribution controlling step of, in the case where print data is received from the outside, causing the image forming portion to form an image of the received print data, and, in the case where a set of print data and user identification information is received from the outside, storing the received set of print data and user identification information into the authenticated printing data storing portion, while prohibiting the image forming portion from forming an image of the received print data; an authenticated printing step of, in response to an event that a user is authenticated in the authentication step, causing the image forming portion to form an image of print data that is stored in the authenticated printing data storing portion at the time of the authentication of the user in the authentication step and that makes a pair with the user identification information of the authenticated user; a print data erasing step of, after an image of the print data is formed by the image forming portion in the authenticated printing step, erasing the print data, the image of which has been formed, from the authenticated printing data storing portion; and a logged-in printing step of, in the case where print data that makes a pair with the user identification information of the authenticated user is stored in the authenticated printing data storing portion during a period in which the login of the user authenticated in the authentication step is valid, causing the image forming portion to form an image of the print data.

According to yet another aspect of the present invention, there is provided a non-transitory computer-readable recording medium encoded with an image forming program performed by a computer, the computer being configured to control an image forming apparatus capable of communicating with a print server, the print server including a spool portion configured to, in the case where a set of print data and user identification information is received from the outside, store the received set of print data and user identification information into a server-side storing portion, and a print data transmitting portion configured to, in response to an event that a print data request is received from the image forming apparatus, in the case where print data that makes a pair with the user identification information included in the received print data request is stored in the server-side storing portion, transmit a set of the print data and the user identification information to the image forming apparatus that issued the print data request, the image forming apparatus including an authenticated printing data storing portion configured to store data, and an image forming portion configured to form an image, wherein the program causes the computer to execute processing including: an authentication step of authenticating a user; a print data receiving step of receiving print data from the outside; a distribution controlling step of, in the case where print data is received from the outside, causing the image forming portion to form an image of the received print data, and, in the case where a set of print data and user identification information is received from the outside, storing the received set of print data and user identification information into the authenticated printing data storing portion, while prohibiting the image forming portion from forming an image of the received print data; an authenticated printing step of, in response to an event that a user is authenticated in the authentication step, causing the image forming portion to form an image of print data that is stored in the authenticated printing data storing portion at the time of the authentication of the user in the authentication step and that makes a pair with the user identification information of the authenticated user; a print data erasing step of, after an image of the print data is formed by the image forming portion in the authenticated printing step, erasing the print data, the image of which has been formed, from the authenticated printing data storing portion; and a logged-in printing step of, in the case where print data that makes a pair with the user identification information of the authenticated user is stored in the authenticated printing data storing portion during a period in which the login of the user authenticated in the authentication step is valid, causing the image forming portion to form an image of the print data.

The foregoing and other features, aspects, and advantages of the present invention will become more apparent from the following detailed description of the present invention when taken in conjunction with the accompanying drawings.

BRIEF DESCRIPTION OF THE DRAWINGS

FIG. 2 is a perspective view of an MFP;

FIG. 4 is a block diagram showing an example of the hardware configuration of a print server;

FIG. 6 is a block diagram showing exemplary functions of a CPU included in the MFP that is set to a pull printing mode;

DESCRIPTION OF THE PREFERRED EMBODIMENTS

Figure 1:
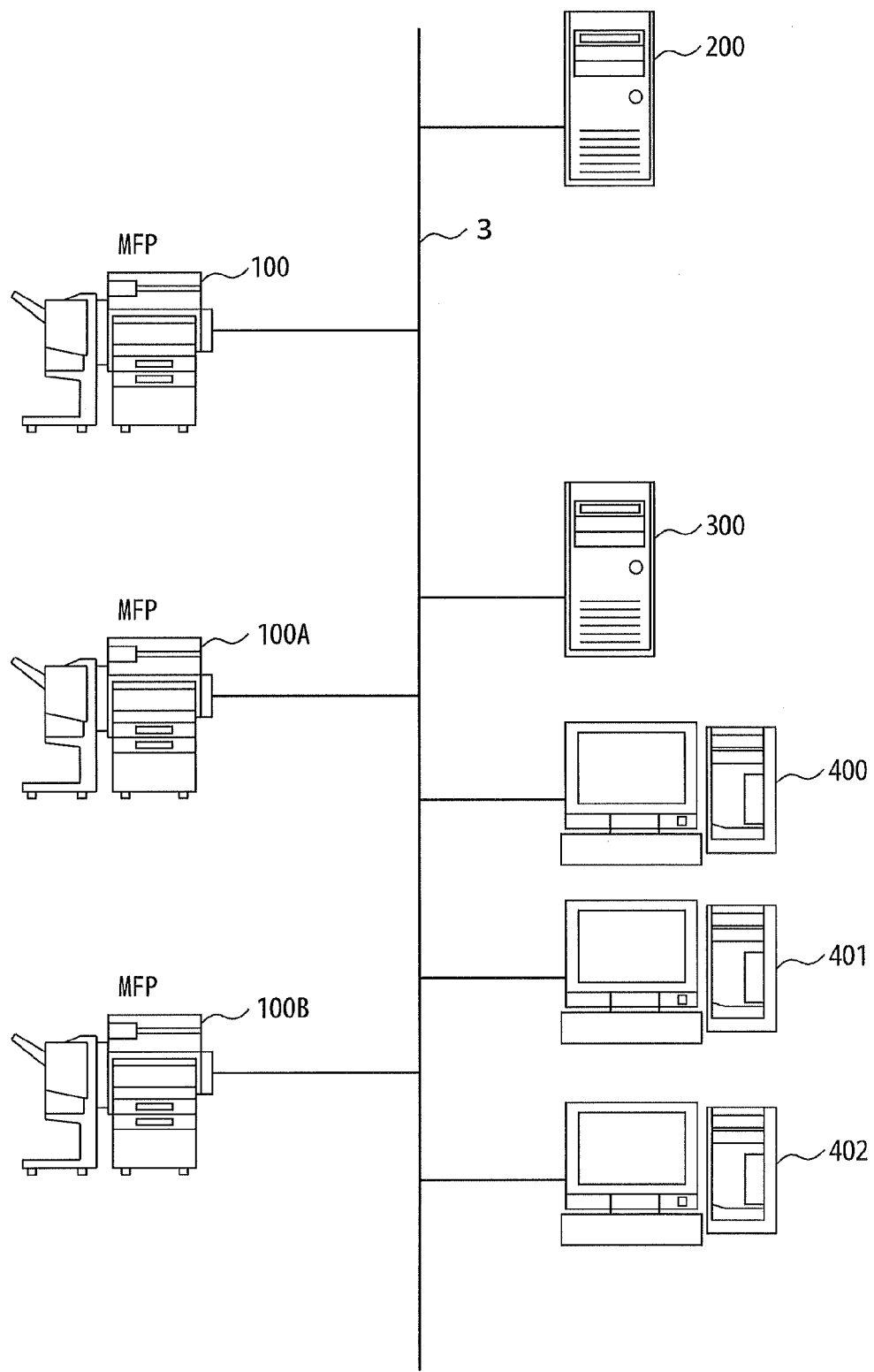
FIG. 1 schematically shows a printing system according to an embodiment of the present invention.

The preferred embodiments of the present invention will be described below in conjunction with the drawings. In the following description, the same or corresponding parts are denoted by the same reference characters. Their names and functions are also the same. Thus, a detailed description thereof will not be repeated.

First Embodiment

FIG. 1 schematically shows a printing system according to an embodiment of the present invention. Referring to FIG. 1, a printing system 1 includes multi-function peripherals (hereinafter, referred to as "MFPs") 100, 100A, and 100B as image forming apparatuses, a print server 200, an authentication server 300, and personal computers (hereinafter, referred to as "PCs") 400 to 402, which are each connected to a network 3. While three MFPs 100, 100A, and 100B are connected to network 3 in FIG. 1, the number of MFPs is not limited thereto; at least one MFP may be connected to network 3. The image forming apparatus is not limited to MFP 100, 100A, or 100B, and may be, e.g., a facsimile machine, printer, or other device having an image forming function. Network 3 is a local area network (LAN), which may be connected in a wired or wireless manner. Network 3 is not necessarily the LAN; it may be a wide area network (WAN), public switched telephone networks (PSTN), the Internet, or the like.

PCs 400 to 402, print server 200, and authentication server 300 are typical computers. Authentication server 300 executes a process for authenticating a user who uses any of PCs 400 to 402 and MFPs 100, 100A, and 100B. Authentication server 300 stores user data including user identification information for identifying users, which have been assigned to the respective users in advance, and authentication information such as passwords. When authentication server 300 receives, from one of PCs 400 to 402 and MFPs 100, 100A, and 100B, user identification information and authentication information which have been input thereto by a user, authentication server 300 compares the received user identification information and authentication information with the user data which have been stored in advance. If the received user identification information and authentication information coincide with the stored user identification information and authentication information, authentication server 300 returns an authentication result indicating that the authentication succeeded; otherwise, authentication server 300 returns an authentication result indicating that the authentication failed.

While the password is used here as the authentication information, biological information such as a fingerprint, a vein pattern, or an iris pattern of the user may also be used for authentication. In this case, a reader for reading the biological information is connected to each of MFPs 100, 100A, and 100B, and the user data stored in authentication server 300 includes the user identification information and the biological information. The biological information read by a reader is input into the corresponding one of MFPs 100, 100A, and 100B, which in turn transmits the biological information received from the reader to authentication server 300 so as to cause authentication server 300 to authenticate the user.

It is noted that PCs 400 to 402, and MFPs 100, 100A, and 100B may also serve as authentication server 300, in which case authentication server 300 is unnecessary.

PCs 400 to 402, which are used by typical users, perform various processes by executing application programs. The various processes include a login process for authenticating a user who uses the PC, and a printing process for generating print data to cause one of MFPs 100, 100A, and 100B to print the print data.

Here, each of MFPs 100, 100A, and 100B may be set to an authenticated printing mode and/or a pull printing mode. It is here assumed that MFP 100 and MFP 100A are set to both of the authenticated printing mode and the pull printing mode, while MFP 100B is set to the pull printing mode alone. Hereinafter, the mode in which both of the authenticated printing mode and the pull printing mode are set will be referred to as the "multimode". MFPs 100 and 100A which are set to the multimode each correspond to a first image forming apparatus, while MFP 100B which is set to the pull printing mode alone corresponds to a second image forming apparatus.

In printing system 1 according to the present embodiment, PCs 400 to 402 each have a printer driver program for authenticated printing installed therein. The driver program for authenticated printing is for controlling MFP 100 and MFP 100A, set to the multimode, in the authenticated printing mode. PCs 400 to 402 each execute the driver program for authenticated printing so as to cause one of MFPs 100 and 100A to print the print data in the authenticated printing mode. Specifically, for example in the case where a user A logs in to PC 400 using user identification information "taro1" and instructs the printing of data which is designated by user A, the driver program for authenticated printing in PC 400 requests the user to designate MFP 100 or MFP 100A. When user A with user identification information "taro1" logs in to PC 400 and inputs MFP 100 as a designated MFP into PC 400, PC 400 transmits authenticated printing data to MFP 100. The authenticated printing data includes print data, which is the data designated by user A and converted into the format for printing, and the user identification information "taro1". When MFP 100 receives the authenticated printing data from PC 400, MFP 100 stores the received authenticated printing data temporarily, rather than printing it immediately, and when user A with user identification information "taro1" logs in to MFP 100, MFP 100 reads the temporarily stored authenticated printing data for printing.

Further, PCs 400 to 402 each have a driver program for pull printing installed therein. PCs 400 to 402 each execute the driver program for pull printing to temporarily store the print data in print server 200. Print server 200 is registered as a destination of print data in each of PCs 400 to 402 when the driver program for pull printing is installed therein. For example, the network address of print server 200 is set for registration of print server 200.

PCs 400 to 402 each execute the driver program for pull printing so as to cause one of MFPs 100 and 100A, which have been set to the multimode, or MFP 100B, which has been set to the pull printing mode, to print the print data in the pull printing mode. Specifically, for example in the case where user A logs in to PC 400 using user identification information "taro1" and designates data as well as print server 200 as a destination of the data, the driver program for pull printing transmits pull printing data to print server 200. The pull printing data includes print data, which is the data designated by the user and converted into the format for printing, and the user identification information "taro1".

When print server 200 receives pull printing data consisting of user identification information and print data from one of PCs 400 to 402, print server 200 temporarily stores the user identification information and the print data in association with each other. Afterwards, user A with the user identification information "taro1" logs in to one of MFPs 100, 100A, and 100B. In the case where user A logs in to MFP 100B that has been set to the pull printing mode alone, MFP 100B transmits a print data request including the user identification information "taro1" of user A to print server 200. When print server 200 receives the print data request, print server 200 extracts, from the temporarily stored pull printing data, the pull printing data that includes the user identification information "taro1" included in the print data request, and transmits the print data included in the extracted pull printing data to MFP 100B that issued the print data request. MFP 100B then prints the print data received from print server 200.

In the case where user A logs in to one of MFPs 100 and 100A which are set to the multimode, the MFP to which user A has logged in acquires print data from print server 200 to print the print data. The operations of print server 200 and MFP 100 or 100A in this case will be described later.

The print data may be transmitted accompanying print conditions such as the number of copies, size of paper, color or monochrome, printing layout, and the like. The print conditions are determined on the basis of values that PC 400, 401, or 402 has accepted from a user. Alternatively, only the print data may be transmitted, accompanying no print conditions, in which case a user may designate the print conditions in one of MFPs 100, 100A, and 100B after the user logs in thereto.

Although the hardware configurations of MFPs 100, 100A, and 100B may be the same with or different from one another, each of MFPs 100, 100A, and 100B has at least an image forming portion for forming an image on a sheet such as paper on the basis of image data. Although the hardware configurations of MFPs 100, 100A, and 100B may be different from one another, it is here assumed that MFP 100 has every configuration included in at least one of the other MFPs 100A and 100B.

FIG. 2 is a perspective view of the MFP. Referring to FIG. 2, MFP 100 includes an automatic document feeder (ADF) 10, an image reading portion 20, an image forming portion 30, a paper feeding portion 40, and a post-processing portion 50.

ADF 10 automatically feeds a plurality of documents set on a document feed tray 11, one by one, to a predetermined document reading position set on a platen glass of image reading portion 20, and outputs the document, the image of which has been read by image reading portion 20, onto a document output tray 12. Image reading portion 20 includes an optical source which irradiates a document placed on the document reading position with light and a photoelectric conversion element which receives light reflected from the document, and scans a document image having a size corresponding to that of the document. The photoelectric conversion element converts the received light into image data made up of electric signals, to output the data to image forming portion 30. Paper feeding portion 40 feeds a sheet of paper, stored in a paper feed tray, to image forming portion 30.

Image forming portion 30 forms an image using well-known electrophotography. Image forming portion 30 performs various kinds of data processing such as shading compensation on image data received from the outside, or on image data received from image reading portion 20, and on the basis of the processed image data, forms an image on a sheet of paper fed by paper feeding portion 40.

Post-processing portion 50 discharges sheets of paper having images formed thereon. Post-processing portion 50 has a plurality of paper discharge trays, allowing the sheets of paper on which images have been formed to be sorted and discharged. Post-processing portion 50 includes a hole-punching portion and a stapling portion, allowing the discharged sheets to be punched or stapled. MFP 100 also has, on its upper surface, an operation panel 9 serving as a user interface.

Figure 3:
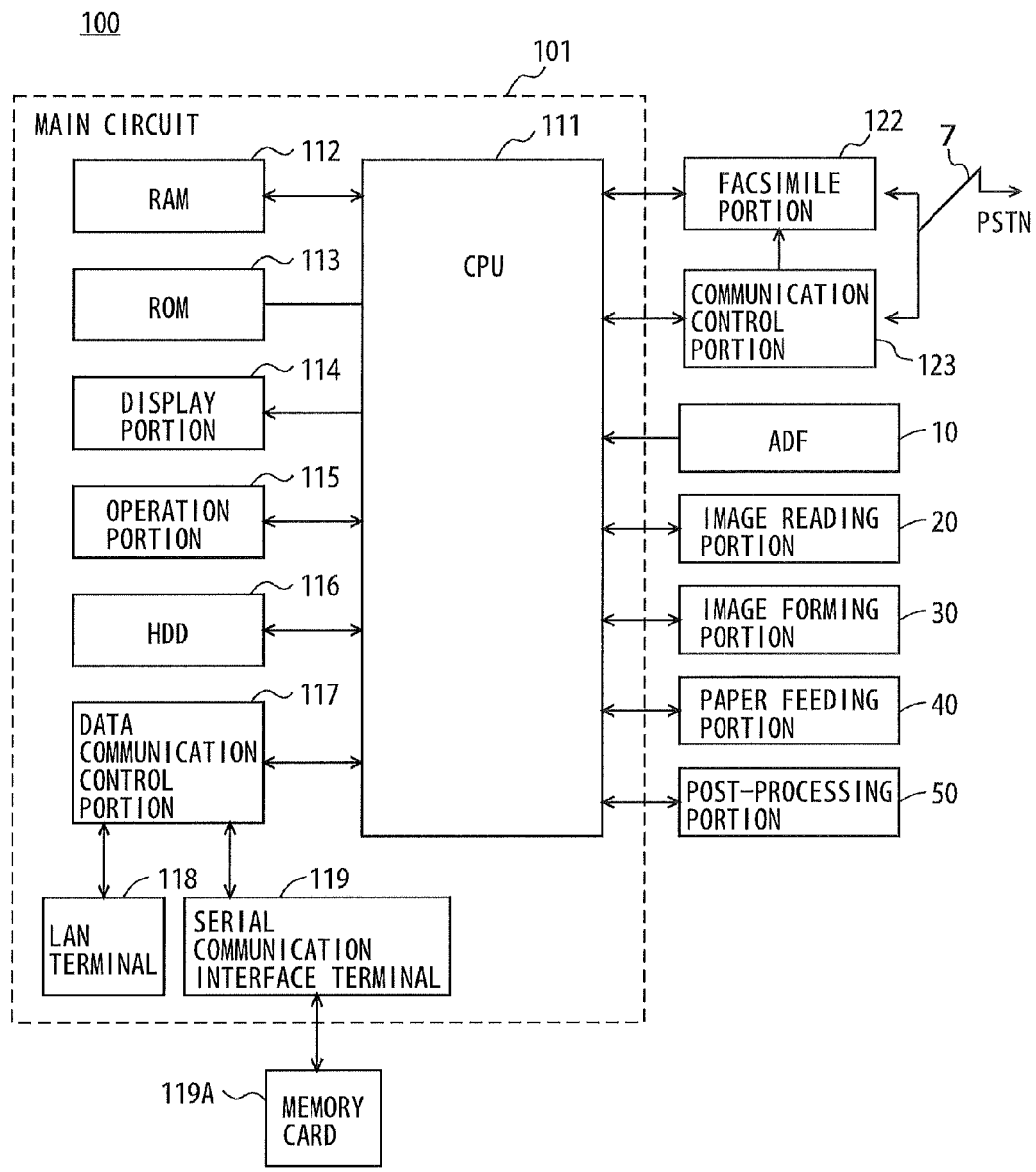
FIG. 3 is a block diagram showing an example of the hardware configuration of the MFP.

FIG. 3 is a block diagram showing an example of the hardware configuration of the MFP. Referring to FIG. 3, MFP 100 includes: a main circuit 101; a facsimile portion 122; and a communication control portion 123. Main circuit 101 is connected with automatic document feeder (ADF) 10, image reading portion 20, image forming portion 30, paper feeding portion 40, and post-processing portion 50.

Main circuit 101 includes: a central processing unit (CPU) 111; a random access memory (RAM) 112 used as a work area for CPU 111; a read only memory (ROM) 113 which stores a program executed by CPU 111 and others; a display portion 114; an operation portion 115; a hard disk drive (HDD) 116 as a mass storage; and a data communication control portion 117.

CPU 111 is connected with RAM 112, ROM 113, display portion 114, operation portion 115, HDD 116, and data communication control portion 117, and is responsible for overall control of main circuit 101. Further, CPU 111 is connected with facsimile portion 122, communication control portion 123, ADF 10, image reading portion 20, image forming portion 30, paper feeding portion 40, and post-processing portion 50, and is responsible for overall control of MFP 100.

Display portion 114 is a display such as a liquid crystal display (LCD), an organic electro-luminescence display (ELD) or the like, and displays an instruction menu for a user, information about acquired image data, and others. Operation portion 115, which is provided with a plurality of keys, accepts data input such as instructions, characters, and numerical characters, according to the key operations by the user. Operation portion 115 further includes a touch panel provided on display portion 114.

Data communication control portion 117 has a LAN terminal 118 which is an interface for communication according to a communication protocol such as transmission control protocol (TCP) or file transfer protocol (FTP), and a serial communication interface terminal 119 for serial communication. Data communication control portion 117, in accordance with an instruction issued from CPU 111, transmits data to or receives data from an external device connected to LAN terminal 118 or serial communication interface terminal 119.

In the case where a LAN cable for connecting to network 3 is connected with LAN terminal 118, data communication control portion 117 communicates with other MFPs 100A and 100B, PCs 400 to 402, print server 200, and authentication server 300 which are each connected via LAN terminal 118. Further, data communication control portion 117 communicates with another computer connected to the Internet.

In the case where a device is connected to serial communication interface terminal 119, data communication control portion 117 communicates with the device connected to serial communication interface terminal 119, such as a digital camera, a digital video camera, or a personal digital assistant, to input image data from or output image data to the device. Further, a memory card 119A containing a flash memory may be connected to serial communication interface terminal 119. CPU 111 controls data communication control portion 117 to read from memory card 119A a program to be executed by CPU 111, and store the read program into RAM 112 for execution.

It is noted that the storage medium for storing a program to be executed by CPU 111 is not restricted to memory card 119A. It may be a flexible disk, a cassette tape, an optical disk (compact disc-read only memory (CD-ROM), magnetic optical disc (MO), mini disc (MD), digital versatile disc (DVD)), an IC card (including a memory card), an optical card, or a semiconductor memory such as a mask ROM, an erasable programmable ROM (EPROM), an electrically erasable and programmable ROM (EEPROM), or the like. Further, CPU 111 may download a program from a computer which is connected to the Internet, to store the program into HDD 116, or a computer which is connected to the Internet may write a program into HDD 116, and then, CPU 111 may load the program stored in HDD 116 into RAM 112 for execution. As used herein, the "program" includes, not only the program which CPU 111 can execute directly, but also a source program, a compressed program, an encrypted program, and others.

Communication control portion 123 is a modem for connecting CPU 111 to PSTN 7. MFP 100 is assigned a telephone number for PSTN 7 in advance. When a call is originated from a facsimile machine which is connected to PSTN 7, to a telephone number assigned to MFP 100, communication control portion 123 detects the call. When detecting the call, communication control portion 123 establishes a call to cause facsimile portion 122 to perform communication.

Facsimile portion 122 is connected to PSTN 7, and transmits facsimile data to or receives facsimile data from PSTN 7. Facsimile portion 122 stores the received facsimile data in HDD 116. It also converts the received facsimile data to print data which can be printed by image forming portion 30, and outputs the print data to image forming portion 30. Image forming portion 30 in turn prints the facsimile data received by facsimile portion 122 on a sheet of paper. Further, facsimile portion 122 converts the data stored in HDD 116 to facsimile data, and transmits the facsimile data to a facsimile machine connected to PSTN 7.

FIG. 4 is a block diagram showing an example of the hardware configuration of a print server. Referring to FIG. 4, print server 200 includes: a CPU 201 which is responsible for overall control of print server 200; a ROM 202 which stores a program executed by CPU 201 and others; a RAM 203 which is used as a work area for CPU 201; a network interface (I/F) 204 which connects print server 200 to a network; a HDD 205 as a mass storage; a display portion 206; an operation portion 207 for accepting an input of an operation by a user; and an external storage device 209, which are each connected to a bus 208.

External storage device 209 can be mounted with a CD-ROM 209A which stores a program. CPU 201 loads a program stored in CD-ROM 209A, via external storage device 209, into RAM 203 for execution. The recording medium for storing the program is not restricted to CD-ROM 209A. It may be a flexible disk, a cassette tape, an optical disk (MO, MD, or DVD), an IC card, an optical card, or a semiconductor memory such as a mask ROM, an EPROM, an EEPROM, or the like. Further, it may be configured to load a program stored in HDD 205 into RAM 203 for execution. In this case, print server 200 may download a program from another computer connected to network 3, and store the program in HDD 205. As used herein, the "program" includes, not only the program which CPU 201 can execute directly, but also a source program, a compressed program, an encrypted program, and others.

Figure 5:
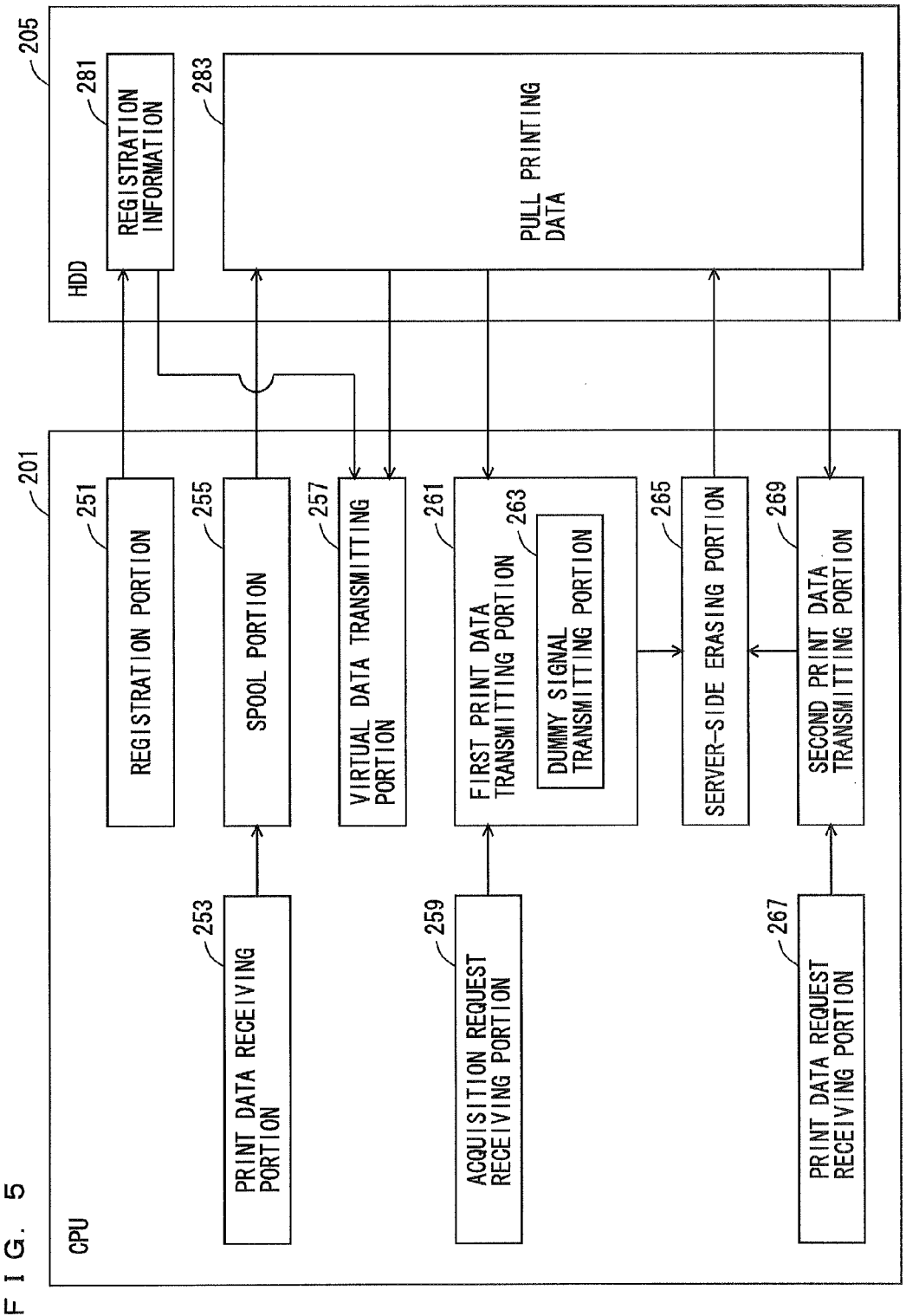
FIG. 5 is a block diagram showing exemplary functions of a CPU included in the print server according to a first embodiment of the present invention.

FIG. 5 is a block diagram showing exemplary functions of a CPU included in the print server according to the first embodiment. The functions shown in FIG. 5 are implemented in CPU 201 included in print server 200 as CPU 201 executes a print data transmitting program stored in ROM 202, HDD 205, or CD-ROM 209A.

Referring to FIG. 5, CPU 201 included in print server 200 includes: a registration portion 251 which registers a device that is set to the multimode; a print data receiving portion 253 which receives data from the outside; a spool portion 255; a virtual data transmitting portion 257 which transmits virtual data; an acquisition request receiving portion 259 which receives an acquisition request; a first print data transmitting portion 261 which transmits print data to the device from which the acquisition request has been transmitted; a print data request receiving portion 267 which receives a print data request; a second print data transmitting portion 269 which transmits print data to the device from which the print data request has been transmitted; and a server-side erasing portion 265 which erases print data.

Registration portion 251 registers a device that is set to the multimode. When an administrator of print server 200 inputs into operation portion 207 device identification information of any device that is set to the multimode, i.e. MFPs 100 and 100A here, registration portion 251 stores the input device identification information as registration information into HDD 205. As a result, registration information 281 is stored in HDD 205. Alternatively, it may be configured such that, when an administrator inputs the device identification information of print server 200 to each of MFPs 100 and 100A at the time of setting MFPs 100 and 100A to the multimode, MFPs 100 and 100A each transmit a registration request including its own device identification information to print server 200, and when network I/F 204 receives the registration request, registration portion 251 stores the device identification information included in the received registration request, as registration information 281, into HDD 205.

Print data receiving portion 253 controls network I/F 204 to receive a set of print data and user identification information from one of PCs 400 to 402. When print data receiving portion 253 receives the set of print data and user identification information, print data receiving portion 253 outputs the received set of print data and user identification information to spool portion 255.

When spool portion 255 receives a set of print data and user identification information from print data receiving portion 253, spool portion 255 stores pull printing data that includes the print data and the user identification information into HDD 205. As a result, pull printing data 283 is stored in HDD 205. Pull printing data 283 associates the print data with the user identification information.

When new pull printing data 283 is stored in HDD 205, virtual data transmitting portion 257 generates virtual data which includes at least: print data identification information for identifying the print data included in the newly stored pull printing data; and the user identification information included in the pull printing data. Virtual data transmitting portion 257 then transmits the generated virtual data to all the devices that are specified by registration information 281 stored in HDD 205. As it is here assumed that the device identification information of MFPs 100 and 100A are stored as registration information 281, the virtual data is transmitted to each of MFPs 100 and 100A via network I/F 204.

Acquisition request receiving portion 259 controls network I/F 204 to receive an acquisition request from one of the devices that are specified by registration information 281 stored in HDD 205. The acquisition request is received from one of MFPs 100 and 100A, which are set to the multimode, and includes the print data identification information. While the processing in which MFPs 100 and 100A transmit the acquisition request to print server 200 will be described later in detail, MFPs 100 and 100A each transmit the acquisition request on the basis of the virtual data received from print server 200. When network I/F 204 receives an acquisition request from one of MFPs 100 and 100A, acquisition request receiving portion 259 outputs the received acquisition request and the device identification information of the device from which the acquisition request has been transmitted, to first print data transmitting portion 261.

In the case where the print data that makes a pair with the print data identification information included in the acquisition request input from acquisition request receiving portion 259 is stored in HDD 205, first print data transmitting portion 261 transmits the print data to the device from which the acquisition request has been transmitted. Specifically, first print data transmitting portion 261 uses the print data identification information included in the acquisition request to search pull printing data 283 stored in HDD 205, for pull printing data 283 that includes the print data identification information. If pull printing data 283 including the print data identification information is extracted, first print data transmitting portion 261 transmits the print data included in the extracted pull printing data 283, via network I/F 204, to the one of MFPs 100 and 100A that is specified by the device identification information input from acquisition request receiving portion 259. When the transmission of the print data is finished, first print data transmitting portion 261 outputs to server-side erasing portion 265 an erase instruction that includes the print data identification information of the transmitted print data.

Print data request receiving portion 267 controls network I/F 204 to receive a print data request. The print data request is received from MFP 100B which is set to the pull printing mode. While the processing in which MFP 100B transmits the print data request to print server 200 will be described later in detail, MFP 100B transmits to print server 200 the print data request including the user identification information for identifying a user at the time when the user logs in to MFP 100B. When network I/F 204 receives the print data request from MFP 100B, print data request receiving portion 267 outputs the received print data request and device identification information of the device from which the print data request has been transmitted, i.e. MFP 100B here, to second print data transmitting portion 269.

In the case where the print data that makes a pair with the user identification information included in the print data request input from print data request receiving portion 267 is stored in HDD 205, second print data transmitting portion 269 transmits a set of the print data and the user identification information to the device from which the print data request has been transmitted. Specifically, second print data transmitting portion 269 uses the user identification information included in the print data request to search pull printing data 283 stored in HDD 205, for pull printing data 283 that includes the user identification information. If pull printing data 283 including the user identification information is extracted, second print data transmitting portion 269 transmits the extracted pull printing data 283, via network I/F 204, to MFP 100B which is specified by the device identification information input from print data request receiving portion 257. When the transmission of the extracted pull printing data 283 is finished, second print data transmitting portion 269 outputs to server-side erasing portion 265 an erase instruction that includes the print data identification information for identifying the print data included in the transmitted pull printing data 283.

When server-side erasing portion 265 receives an erase instruction from first print data transmitting portion 261 or second print data transmitting portion 269, server-side erasing portion 265 erases from HDD 205 pull printing data 283 that includes the print data specified by the print data identification information included in the erase instruction.

First print data transmitting portion 261 includes a dummy signal transmitting portion 263. Pull printing data 283 stored in HDD 205 may be erased by server-side erasing portion 265, and thus, there may be a case where HDD 205 stores no print data that makes a pair with the print data identification information that is included in the acquisition request input from acquisition request receiving portion 259. In such a case that no pull printing data 283 including the print data that is specified by the print data identification information included in the acquisition request input from acquisition request receiving portion 259 is stored in HDD 205, dummy signal transmitting portion 263 transmits a dummy signal including the print data identification information, to the device from which the acquisition request has been transmitted. Specifically, as a result of searching pull printing data 283 stored in HDD 205 using the print data identification information included in the acquisition request, if no pull printing data 283 including the print data identification information has been extracted, dummy signal transmitting portion 263 transmits a dummy signal including the print data identification information, via network I/F 204, to the one of MFPs 100 and 100A that is specified by the device identification information input from acquisition request receiving portion 259.

FIG. 6 is a block diagram showing exemplary functions of a CPU included in the MFP that is set to the pull printing mode. The functions shown in FIG. 6 are formed in CPU 111A included in MFP 100B, which is set to the pull printing mode, as CPU 111A executes an image forming program for pull printing that is stored in ROM 113, HDD 116, or memory card 119A.

Referring to FIG. 6, CPU 111 included in MFP 100B which is set to the pull printing mode includes: a data receiving portion 51 which receives print data from the outside; an image forming control portion 57 which controls image forming portion 30; an authentication portion 63 which authenticates a user who operates MFP 100B; and a print data request transmitting portion 71 which transmits a print data request.

Authentication portion 63 authenticates a user who operates MFP 100B. Specifically, authentication portion 63 displays a login screen on display portion 114. The login screen includes an area for inputting user identification information, and an area for inputting a password. When a user inputs user identification information and a password into operation portion 115, authentication portion 63 accepts the user identification information and the password from operation portion 115, transmits the accepted user identification information and password to authentication server 300 via data communication control portion 117, to cause authentication server 300 to authenticate the user. When authentication server 300 receives the user identification information and the password, authentication server 300 compares the user identification information and the password with user data stored in advance. If the matching data is found, authentication server 300 returns an authentication result indicating that the authentication succeeded; otherwise, authentication server 300 returns an authentication result indicating that the authentication failed. Here, the user data includes user identification information for identifying a user, and a password.

When data communication control portion 117 receives an authentication result from authentication server 300, authentication portion 63 accepts the authentication result. If the authentication result indicates that the authentication succeeded, authentication portion 63 outputs the user identification information of the logged-in user to print data request transmitting portion 71. On the other hand, if the authentication result indicates that the authentication failed, authentication portion 63 displays an error message on display portion 114. Once authentication portion 63 receives the authentication result indicating that the authentication succeeded, any operation that is subsequently input into operation portion 115 is accepted as an operation by the user who has been authenticated and permitted to log in to MFP 100B.

When print data request transmitting portion 71 receives the user identification information of the logged-in user from authentication portion 63, print data request transmitting portion 71 transmits a print data request including the received user identification information to print server 200 via data communication control portion 117. Information about the destination of the print data request, which is exactly the device identification information of print server 200 here, is stored in HDD 116 by a user in advance when MFP 100B is set to the pull printing mode.

As described previously, when print server 200 receives a print data request, if HDD 205 stores pull printing data 283 that includes the user identification information included in the received print data request, print server 200 returns the user identification information and the print data included in that pull printing data.

When data communication control portion 117 receives the print data and the user identification information from print server 200, data receiving portion 51 acquires the print data, and outputs the acquired print data to image forming control portion 57. When image forming control portion 57 receives the print data from data receiving portion 51, image forming control portion 57 prints the print data. Specifically, image forming control portion 57 outputs the print data to image forming portion 30, to cause image forming portion 30 to form an image of the print data.

This means that when a user logs in to MFP 100B which is set to the pull printing mode, if HDD 205 stores therein, at the time of the login of the user, pull printing data including the user identification information of the logged-in user, then the print data included in that pull printing data is printed. To this end, a user may use one of PCs 400 to 402 to perform an operation for transmitting the print data to print server 200, before logging in to MFP 100B which is set to the pull printing mode.

Figure 7:
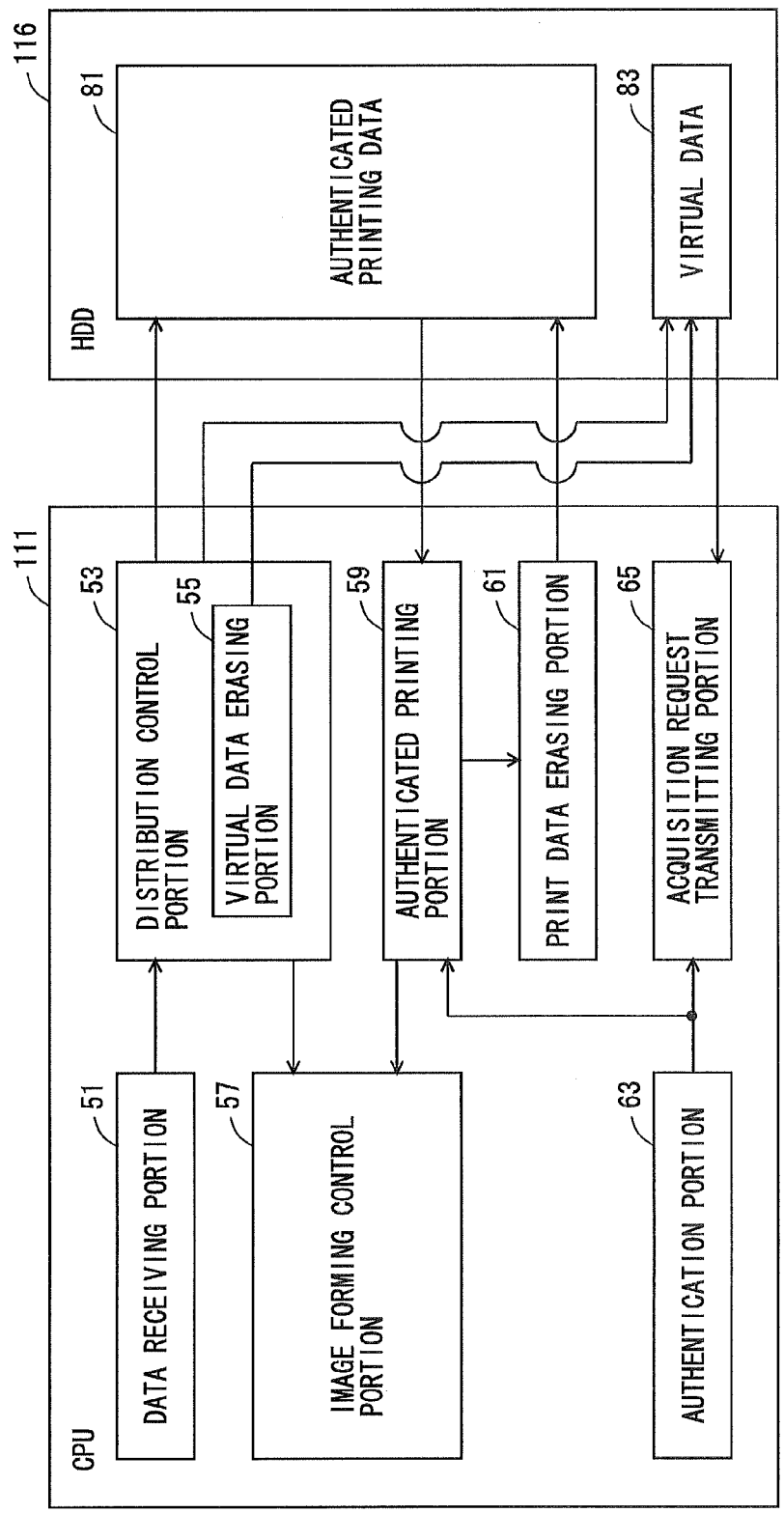
FIG. 7 is a block diagram showing exemplary functions of a CPU included in the MFP that is set to a multimode, according to the first embodiment.

FIG. 7 is a block diagram showing exemplary functions of a CPU included in the MFP that is set to a multimode, according to the first embodiment. The functions shown in FIG. 7 are formed in CPU 111 included in each of MFPs 100 and 100A that are set to the multimode as CPU 111 executes an image forming program for the multimode that is stored in ROM 113, HDD 116, or memory card 119A. CPUs 111 included in MFPs 100 and 100A that are set to the multimode are identical in terms of functions to each other, and thus, CPU 111 included in MFP 100 will be described representatively. Further, the functions identical to those shown in FIG. 6 are denoted by the same reference characters, and a description thereof will not be repeated here.

Referring to FIG. 7, CPU 111 included in MFP 100 includes: a data receiving portion 51; a distribution control portion 53; an image forming control portion 57; an authenticated printing portion 59; a print data erasing portion 61; an authentication portion 63; and an acquisition request transmitting portion 65.

Data receiving portion 51 controls data communication control portion 117 to receive data from the outside. When data receiving portion 51 receives a set of print data and user identification information, data receiving portion 51 outputs the received set of print data and user identification information to distribution control portion 53. The set of print data and user identification information may be transmitted from print server 200 that has received a print data request, or from PC 400, 401, or 402 which executes a printer driver for authenticated printing.

When data receiving portion 51 receives virtual data transmitted from print server 200, data receiving portion 51 outputs the received virtual data to distribution control portion 53. As described previously, when print server 200 receives a set of print data and user identification information from one of PCs 400 to 402, print server 200 stores the received set of print data and user identification information as pull printing data 283 into HDD 205, and also transmits the virtual data to MFPs 100 and 100A that have been registered in print server 200.

Further, when data receiving portion 51 receives print data transmitted from print server 200 that had received an acquisition request, data receiving portion 51 outputs the received print data to distribution control portion 53. Furthermore, when data receiving portion 51 receives a dummy signal transmitted from print server 200 that had received an acquisition request, data receiving portion 51 outputs the received dummy signal to distribution control portion 53.

In the case where distribution control portion 53 receives print data from data receiving portion 51, distribution control portion 53 outputs the received print data to image forming control portion 57 so as to cause image forming portion 30 to print the print data. Further, in the case where distribution control portion 53 receives a set of print data and user identification information from data receiving portion 51, distribution control portion 53 stores the received set of print data and user identification information as authenticated printing data 81 into HDD 116, without outputting the print data to image forming control portion 57. As no print data is output to image forming control portion 57, image forming portion 30 is prohibited from forming an image of the print data.

Furthermore, in the case where distribution control portion 53 receives virtual data from data receiving portion 51, distribution control portion 53 stores the received virtual data into HDD 116. As a result, virtual data 83 is stored in HDD 116.

When a user who operates MFP 100 is authenticated by authentication portion 63 and permitted to log in to MFP 100, authenticated printing portion 59 receives the user identification information of the logged-in user from authentication portion 63. In response to the event that the user identification information is received from authentication portion 63, in the case where print data that makes a pair with the received user identification information is stored in HDD 116, authenticated printing portion 59 causes image forming control portion 57 to print the print data. Specifically, authenticated printing portion 59 uses the user identification information of the user authenticated by authentication portion 63 to search authenticated printing data 81 stored in HDD 116 for authenticated printing data 81 that includes the user identification information. If authenticated printing data 81 including the user identification information is extracted, authenticated printing portion 59 transmits the print data included in the extracted authenticated printing data 81, to image forming control portion 57. In the case where a plurality of pieces of authenticated printing data 81 including the user identification information are extracted, authenticated printing portion 59 outputs to image forming control portion 57 all pieces of print data that are included respectively in the extracted pieces of authenticated printing data. Further, when the printing of the print data by image forming control portion 57 is finished, authenticated printing portion 59 outputs an erase instruction including the print data identification information for identifying the printed print data to print data erasing portion 61.

When print data erasing portion 61 receives an erase instruction from authenticated printing portion 59, print data erasing portion 61 erases from HDD 116 authenticated printing data 81 that includes the print data specified by the print data identification information included in the received erase instruction. This is for the purposes of preventing the same print data from being printed twice or more when the user logs in the second time or later.

When a user who operates MFP 100 is authenticated by authentication portion 63 and permitted to log in to MFP 100, acquisition request transmitting portion 65 receives the user identification information of the logged-in user from authentication portion 63. In response to the event that the user identification information is received from authentication portion 63, in the case where virtual data 83 including the user identification information is stored in HDD 116, acquisition request transmitting portion 65 transmits an acquisition request that includes the print data identification information included in that virtual data 83 to print server 200. Specifically, acquisition request transmitting portion 65 uses the user identification information input from authentication portion 63 to search virtual data 83 stored in HDD 116, for virtual data 83 that includes the user identification information. If virtual data 83 including the user identification information is extracted, acquisition request transmitting portion 65 transmits the acquisition request that includes the print data identification information included in the extracted virtual data 83, to print server 200 via data communication control portion 117. In the case where a plurality of pieces of virtual data 83 including the user identification information are extracted, acquisition request transmitting portion 65 outputs to print server 200 a plurality of acquisition requests that include the respective pieces of print data identification information included respectively in all the extracted pieces of virtual data 83.

As described previously, when print server 200 receives an acquisition request, if HDD 205 stores therein the print data that is specified by the print data identification information included in the acquisition request, print server 200 transmits the print data to the device from which the acquisition request has been transmitted. On the other hand, if HDD 205 stores no print data specified by the print data identification information included in the acquisition request, print server 200 transmits a dummy signal including the print data identification information to the device from which the acquisition request has been transmitted.

In the case where data receiving portion 51 receives print data from print server 200, the print data received by data receiving portion 51 is output to image forming control portion 57 by distribution control portion 53, so that an image of the print data is formed by image forming portion 30. In the case where data receiving portion 51 receives a dummy signal from print server 200, the dummy signal received by data receiving portion 51 is output to distribution control portion 53. Distribution control portion 53 includes a virtual data erasing portion 55.

In the case where virtual data erasing portion 55 receives print data from data receiving portion 51, virtual data erasing portion 55 erases from HDD 116 virtual data 83 that includes the print data identification information of the print data. Further, in the case where virtual data erasing portion 55 receives a dummy signal from data receiving portion 51, virtual data erasing portion 55 erases from HDD 116 virtual data 83 that includes the print data identification information included in the dummy signal. Specifically, virtual data erasing portion 55 uses the print data identification information included in the dummy signal to search virtual data 83 stored in HDD 116, and erases from HDD 116 virtual data 83 that includes the print data identification information. As a result, after pull printing data stored in print server 200 is printed in one of MFPs 100, 100A, and 100B, virtual data including the print data identification information of the printed print data is erased from HDD 116 in each of MFPs 100, 100A, and 100B. This prevents the virtual data that is no longer necessary from being left stored in HDD 116.

Figure 8:
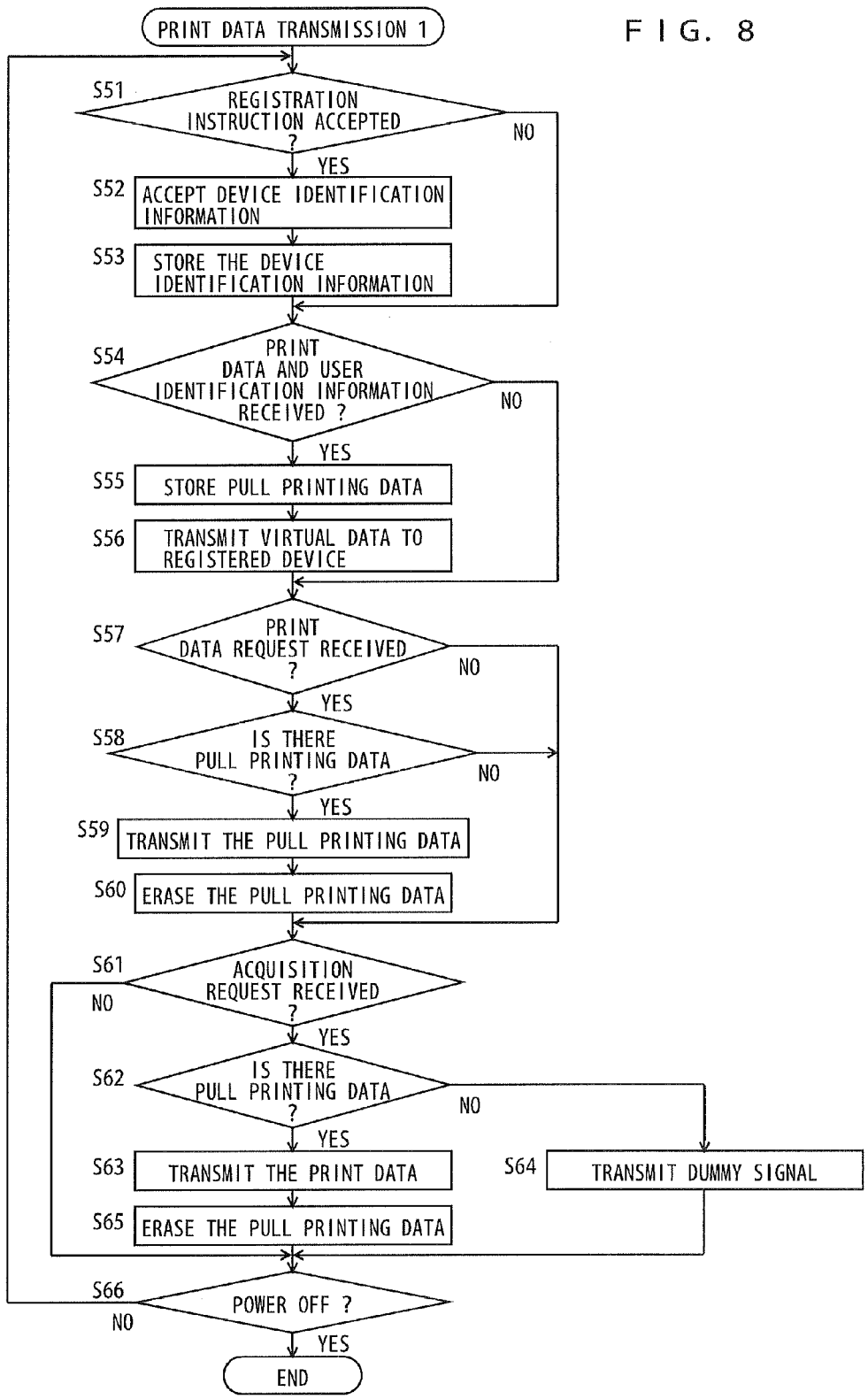
FIG. 8 is a flowchart illustrating an example of the flow of a print data transmitting process according to the first embodiment.

FIG. 8 is a flowchart illustrating an example of the flow of a print data transmitting process according to the first embodiment. The print data transmitting process is carried out by CPU 201 included in print server 200 according to the first embodiment as CPU 201 executes the print data transmitting program stored in ROM 202, HDD 205, or CD-ROM 209A.

Referring to FIG. 8, CPU 201 determines whether a registration instruction has been accepted (step S51). When a user presses a key that is included in operation portion 207 and to which a registration instruction is assigned, CPU 201 accepts the registration instruction. If a registration instruction has been accepted, the process proceeds to step S52; otherwise, the process proceeds to step S54. In step S52, CPU 201 accepts device identification information for identifying the device to be registered. Specifically, CPU 201 accepts the device identification information that a user inputs into operation portion 207. Then, CPU 201 stores the accepted device identification information into HDD 205 (step S53). As a result, the device identification information is stored as registration information 281 in HDD 205. It is here assumed that MFPs 100 and 100A are registered.

In step S54, CPU 201 determines whether print data and user identification information have been received. Specifically, CPU 201 determines whether network I/F 204 has received print data and user identification information from one of PCs 400 to 402. If so, the process proceeds to step S55; otherwise, the process proceeds to step S57. In step S55, CPU 201 stores pull printing data including the print data and the user identification information into HDD 205. Then, CPU 201 transmits virtual data to the registered device (step S56). The registered device is the device specified by the device identification information stored in HDD 205 in step S53. Thus, here, the virtual data is transmitted to MFPs 100 and 100A. The virtual data includes print data identification information for identifying the print data received in step S54, and the user identification information received in step S54.

In step S57, CPU 201 determines whether a print data request has been received. Specifically, CPU 201 determines whether network I/F 204 has received a print data request from MFP 100B which is set to the pull printing mode. If a print data request has been received, the process proceeds to step S58; otherwise, the process proceeds to step S61. In step S58, CPU 201 determines whether pull printing data 283 that includes the user identification information included in the received print data request is stored in HDD 205. If so, the process proceeds to step S59; otherwise, the process proceeds to step S61.

In step S59, CPU 201 extracts pull printing data 283 including the user identification information that is included in the print data request received in step S57, and transmits the print data included in the extracted pull printing data 283 to the device that issued the print data request, i.e. MFP 100B here. In the following step S60, CPU 201 erases from HDD 205 pull printing data 283 including the transmitted print data, and the process proceeds to step S61.

In step S61, CPU 201 determines whether an acquisition request has been received. Specifically, CPU 201 determines whether network I/F 204 has received an acquisition request from one of MFPs 100 and 100A which are set to the multi-mode. It is here assumed that an acquisition request is received from MFP 100. If an acquisition request has been received, the process proceeds to step S62; otherwise, the process proceeds to step S66. In step S62, CPU 201 determines whether pull printing data 283 including the print data that is specified by the print data identification information included in the received acquisition request is stored in HDD 205. If so, the process proceeds to step S63; otherwise, the process proceeds to step S64.

In step S63, CPU 201 extracts pull printing data 283 including the print data that is specified by the print data identification information included in the acquisition request received in step S61, and transmits the print data included in the extracted pull printing data 283 to the device that issued the acquisition request, i.e. MFP 100 here. In the following step S65, CPU 201 erases from HDD 205 pull printing data 283 including the transmitted print data, and the process proceeds to step S66.

On the other hand, in step S64, CPU 201 transmits a dummy signal including the print data identification information included in the acquisition request received in step S61, to the device that issued the acquisition request, i.e. MFP 100 here, and the process proceeds to step S66.

In step S66, CPU 201 determines whether main power supply has been turned off. If a user turns off a power supply switch included in operation portion 207, CPU 201 determines that the main power supply has been turned off. If the main power supply has been turned off, the process is terminated; otherwise, the process returns to step S51.

Figure 9:
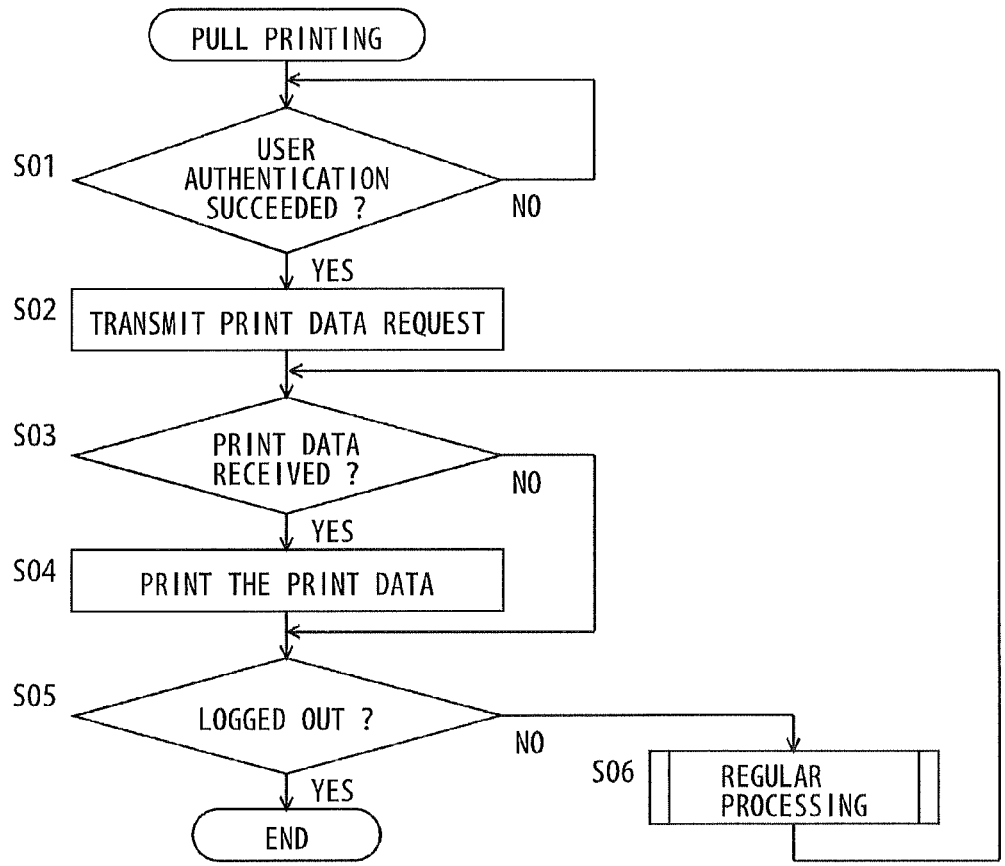
FIG. 9 is a flowchart illustrating an example of the flow of a pull printing process.

FIG. 9 is a flowchart illustrating an example of the flow of a pull printing process. The pull printing process is carried out by CPU 111 included in MFP 100B which is set to the pull printing mode as CPU 111 executes the image forming program for pull printing stored in ROM 113, HDD 116, or memory card 119A.

Referring to FIG. 9, CPU 111 determines whether a user authentication has succeeded (step S01). Specifically, CPU 111 accepts user identification information and a password input from a user who operates MFP 100B, and requests authentication server 300 to authenticate the user. Then, if CPU 111 receives an authentication result indicating that the authentication has succeeded from authentication server 300, CPU 111 determines that the authentication has succeeded. CPU 111 is in a standby mode until the user authentication succeeds ("NO" in step S01), and once the user authentication succeeds ("YES" in step S01), the process proceeds to step S02.

In step S02, CPU 111 transmits a print data request to print server 200. The print data request includes the user identification information of the user authenticated in step S01. In the following step S03, CPU 111 determines whether print data has been received. If so, the process proceeds to step S04; otherwise, the process proceeds to step S05. In step S04, CPU 111 prints the received print data, and the process proceeds to step S05.

In step S05, CPU 111 determines whether a logout condition has been satisfied. In the case where a predetermined key in operation portion 115 is pressed by the user, or in the case where a predetermined time period has elapsed with no operation input into operation portion 115 by the user, CPU 111 determines that the logout condition has been satisfied. If the logout condition has been satisfied, the process is terminated; otherwise, the process proceeds to step S06.

In step S06, CPU 111 executes regular processing, and the process returns to step S03. The regular processing is for causing one or more functions included in MFP 100B to be executed. The functions include, for example, a copying function, a facsimile transmitting/receiving function, a printing function for forming an image of image data stored in HDD 116, and others. After the regular processing is executed, the process returns to step S03. Therefore, if print data is received from print server 200 during or after the regular processing, a process for printing the received print data is executed.

Figure 10:
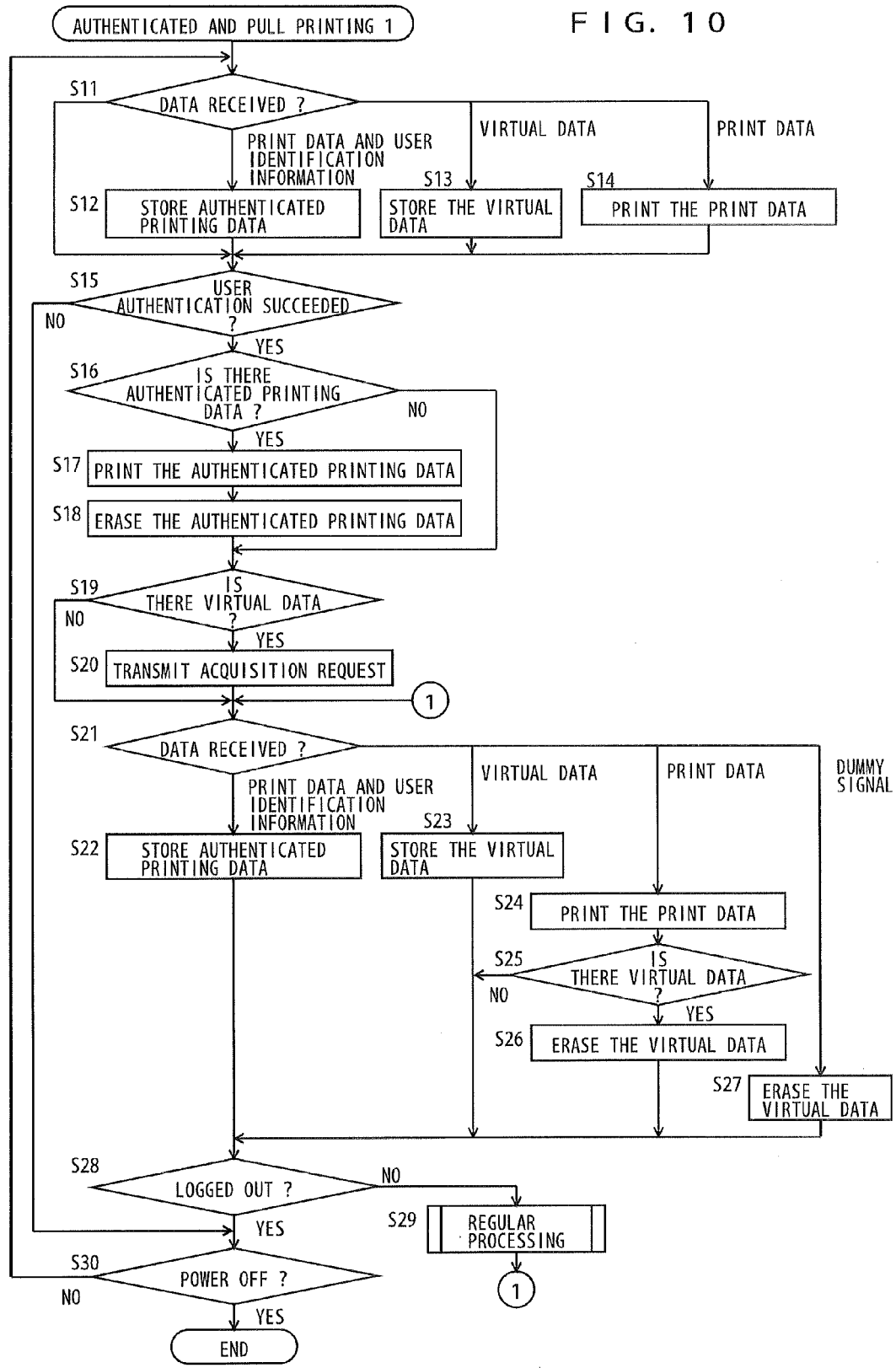
FIG. 10 is a flowchart illustrating an example of the flow of an authenticated and pull printing process according to the first embodiment.

FIG. 10 is a flowchart illustrating an example of the flow of an authenticated and pull printing process according to the first embodiment. The authenticated and pull printing process is carried out by CPU 111 included in each of MFPs 100 and 100A, which are set to the multimode, according to the first embodiment, as CPU 111 executes the image forming program for the multimode stored in ROM 113, HDD 116, or memory card 119A. The processes performed by MFPs 100 and 100A are identical to each other. Therefore, it is here assumed that CPU 111 included in MFP 100 executes the image forming program for the multimode.

Referring to FIG. 10, CPU 111 included in MFP 100 which is set to the multimode determines whether data has been received (step S11). If data communication control portion 117 has received data, the process branches in accordance with the received data, otherwise, the process proceeds to step S15. If the received data is a set of print data and user identification information, the process proceeds to step S12. If the received data is virtual data, the process proceeds to step S13. If the received data is print data, the process proceeds to step S14. In step S12, CPU 111 stores in HDD 116 authenticated printing data that includes the set of print data and user identification information, and the process proceeds to step S15. In step S13, CPU 111 stores the virtual data in HDD 116, and the process proceeds to step S15. In step S14, CPU 111 prints the print data, and the process proceeds to step S15. For printing the print data, CPU 111 outputs the print data to image forming portion 30 to cause image forming portion 30 to form an image of the print data.

In step S15, CPU 111 determines whether a user authentication has succeeded. Specifically, CPU 111 accepts user identification information and a password input from a user who operates MFP 100, and requests authentication server 300 to authenticate the user. If CPU 111 receives an authentication result indicating that the authentication has succeeded from authentication server 300, CPU 111 determines that the authentication has succeeded. If the user authentication has succeeded, the process proceeds to step S16; otherwise, the process proceeds to step S30.

In step S16, CPU 111 determines whether authenticated printing data 81 stored in HDD 116 contains therein the authenticated printing data 81 that includes the user identification information of the user authenticated in step S15. If so, the process proceeds to step S17; otherwise, the process proceeds to step S19. In step S17, CPU 111 prints the print data that is included in authenticated printing data 81 including the user identification information of the authenticated user, and the process proceeds to step S18. In step S18, CPU 111 erases from HDD 116 the authenticated printing data 81 including the printed print data, and the process proceeds to step S19.

In step S19, CPU 111 determines whether virtual data 83 stored in HDD 116 contains therein the virtual data 83 that includes the user identification information of the user authenticated in step S15. If so, the process proceeds to step S20; otherwise, the process proceeds to step S21. In step S20, CPU 111 transmits to print server 200 an acquisition request including the print data identification information that is included in virtual data 83 including the user identification information of the authenticated user, and the process proceeds to step S21.

As described previously, when print server 200 receives an acquisition request, if the pull printing data including the print data identification information included in the acquisition request is stored in HDD 205, print server 200 returns print data that is included in the pull printing data; otherwise, print server 200 returns a dummy signal including the print data identification information.

In step S21, CPU 111 determines whether data has been received. If data communication control portion 117 has received data, the process branches in accordance with the received data. If the received data is a set of print data and user identification information, the process proceeds to step S22. If the received data is virtual data, the process proceeds to step S23. If the received data is print data, the process proceeds to step S24. If the received data is a dummy signal, the process proceeds to step S27.

In step S22, CPU 111 stores in HDD 116 authenticated printing data including the set of print data and user identification information, and the process proceeds to step S28. In step S23, CPU 111 stores the virtual data in HDD 116, and the process proceeds to step S28. In step S24, CPU 111 prints the print data, and the process proceeds to step S25. In step S25, CPU 111 determines whether virtual data 83 including the print data identification information of the printed print data is stored in HDD 116. If so, the process proceeds to step S26; otherwise, the process proceeds to step S28. In step S26, CPU 111 erases from HDD 116 virtual data 83 including the print data identification information of the printed print data, and the process proceeds to step S28.

In step S27, CPU 111 erases from HDD 116 virtual data 83 including the print data identification information included in the dummy signal, and the process proceeds to step S28. Virtual data 83 erased in step S27 corresponds to virtual data 83 extracted in step S19.

In step S28, CPU 111 determines whether a logout condition has been satisfied. In the case where a predetermined key in operation portion 115 is pressed, or a predetermined time period has elapsed with no operation input into operation portion 115 by the user, CPU 111 determines that the logout condition has been satisfied. If the logout condition has been satisfied, the process proceeds to step S30; otherwise, the process proceeds to step S29.

In step S29, CPU 111 executes regular processing, and the process returns to step S21. The regular processing is for causing one or more functions included in MFP 100 to be executed. The functions include, for example, a copying function, a facsimile transmitting/receiving function, a printing function for forming an image of image data stored in HDD 116, and others. After the regular processing is executed, the process returns to step S21. Therefore, if print data is received from print server 200 during or after the regular processing, a process for printing the received print data is executed.

In step S30, CPU 111 determines whether main power supply has been turned off. If a user turns off a power supply switch included in operation portion 115, CPU 111 determines that the main power supply has been turned off. If the main power supply has been turned off, the process is terminated; otherwise, the process returns to step S11.

As described above, in printing system 1 of the first embodiment, when one of MFPs 100 and 100A which are set to the multimode receives print data from one of PCs 400 to 402 or print server 200, it prints the print data. When MFP 100 or 100A receives a set of print data and user identification information from one of PCs 400 to 402, it stores the set of print data and user identification information as authenticated printing data 81 into HDD 116, without printing the print data. When MFP 100 or 100A receives virtual data from print server 200, it stores the data as virtual data 83 into HDD 116. Further, at the time point when a user is authenticated, if authenticated printing data 81 including the user identification information of the authenticated user is contained in authenticated printing data 81 stored in HDD 116, MFP 100 or 100A prints the print data included in that authenticated printing data 81, whereas if virtual data 83 including the user identification information of the authenticated user is stored in HDD 116, MFP 100 or 100A transmits an acquisition request including the print data identification information included in that virtual data, to print server 200.

When print server 200 receives a set of print data and user identification information from one of PCs 400 to 402, print server 200 stores the set of print data and user identification information as pull printing data 283 into HDD 205. When print server 200 receives an acquisition request from one of MFPs 100 and 100A, print server 200 extracts, from pull printing data 283 stored in HDD 205, pull printing data 283 that includes the print data specified by the print data identification information included in the received acquisition request, and returns thereto the print data included in the extracted pull printing data 283. When MFP 100 or 100A that issued the acquisition request receives the print data from print server 200, it prints the received print data.

This means that, once a user is authenticated by MFP 100 which is set to the multimode, the print data that is stored in one of MFP 100 and print server 200 at the time of the authentication of the user can be printed in MFP 100.

Further, when print server 200 transmits pull printing data 283 stored in HDD 205, or the print data included in pull printing data 283, to one of MFPs 100, 100A, and 100B, print server 200 erases the transmitted pull printing data 283, or the pull printing data 283 including the transmitted print data, from HDD 205. This prevents the same print data from being transmitted to any of MFPs 100, 100A, and 100B twice.

In the case where print server 200 receives an acquisition request from MFP 100 which is set to the multimode, if no print data specified by the print data identification information included in the acquisition request is stored in HDD 205, print server 200 transmits a dummy signal including the print data identification information included in the acquisition request and indicating that the print data has already been printed, to MFP 100 that issued the acquisition request.

When MFP 100 receives the dummy signal, MFP 100 erases from virtual data 83 stored in HDD 116 virtual data 83 that includes the print data identification information included in the received dummy signal. This prevents, even if the same user is authenticated twice, an acquisition request including the same print data identification information from being transmitted to print server 200 twice.

Furthermore, when MFP 100 which is set to the multimode finishes printing of the print data included in authenticated printing data 81, MFP 100 erases authenticated printing data 81 including the printed print data from HDD 116. This prevents the same print data from being printed twice even if the same user is authenticated twice.

Second Embodiment

A printing system 1 according to a second embodiment will now be described. The overall configuration of printing system 1 according to the second embodiment is identical to that shown in FIG. 1. As with MFPs 100, 100A, and 100B according to the first embodiment, it is assumed in the second embodiment that MFPs 100 and 100A are set to the multimode, and MFP 100B is set to the pull printing mode. MFPs 100 and 100A which are set to the multimode correspond to the first image forming apparatus, while MFP 100B which is set to the pull printing mode alone corresponds to the second image forming apparatus.

Printing system 1 according to the first embodiment has been configured such that, when a user logs in to one of MFPs 100 and 100A set to the multimode, it transmits an acquisition request to print server 200. Printing system 1 according to the second embodiment is configured such that, when a user logs in to one of MFPs 100 and 100A set to the multimode, it transmits, not the acquisition request, but a print data request to print server 200, as with MFP 100B set to the pull printing mode.

Accordingly, print server 200 in the second embodiment differs from print server 200 in the first embodiment in that it only needs to correspond to the pull printing mode. In the following, differences from printing system 1 in the first embodiment will primarily be described.

The operations of PCs 400 to 402 are identical to those described in the first embodiment. Each of PCs 400 to 402 can execute a printer driver program for authenticated printing to transmit authenticated printing data to MFP 100 or 100A which is set to the multimode, so as to cause the MFP to perform authenticated printing. Each of PCs 400 to 402 can also execute a printer driver program for pull printing to transmit pull printing data to print server 200, so as to cause print server 200 to temporarily store the pull printing data.

Each of PCs 400 to 402 executes the printer driver program for authenticated printing to cause MFP 100 or 100A to print the print data in the authenticated printing mode. Specifically, for example in the case where a user A logs in to PC 400 using user identification information "taro1" and instructs the printing of the data designated by user A, then the printer driver program for authenticated printing requests the user to specify either MFP 100 or MFP 100A. When the user with user identification information "taro1" logs in to PC 400 and inputs a designation of MFP 100 into PC 400, PC 400 transmits the authenticated printing data to MFP 100. The authenticated printing data includes print data of the data designated by the user, and the user identification information "taro1". When MFP 100 receives the authenticated printing data from PC 400, MFP 100 temporarily stores the received authenticated printing data, rather than printing the same immediately. When user A with user identification information "taro1" logs in to MFP 100, MFP 100 reads and prints the temporarily stored authenticated printing data.

Each of PCs 400 to 402 executes the driver program for pull printing to cause MFP 100 or 100A, set to the multimode, or MFP 100B, set to the pull printing mode, to print the print data in the pull printing mode. Specifically, for example in the case where a user A logs in to PC 400 using user identification information "taro1" and instructs the printing of the data designated by user A in the pull printing mode, then the driver program for pull printing transmits the pull printing data to print server 200. The pull printing data includes the print data of the data designated by the user, and the user identification information "taro1".

When print server 200 receives pull printing data which includes a set of user identification information and print data from one of PCs 400 to 402, print server 200 temporarily stores them in association with each other. Thereafter, when user A with user identification information "taro1" logs in to one of MFPs 100, 100A, and 100B, the MFP transmits to print server 200 a print data request including the user identification information "taro1" of user A. When print server 200 receives the print data request, print server 200 extracts, from the temporarily stored pull printing data, the pull printing data including the user identification information "taro1" included in the print data request, and transmits the print data included in the extracted pull printing data to the MFP that issued the print data request. The MFP then prints the print data received from print server 200.

Figure 11:
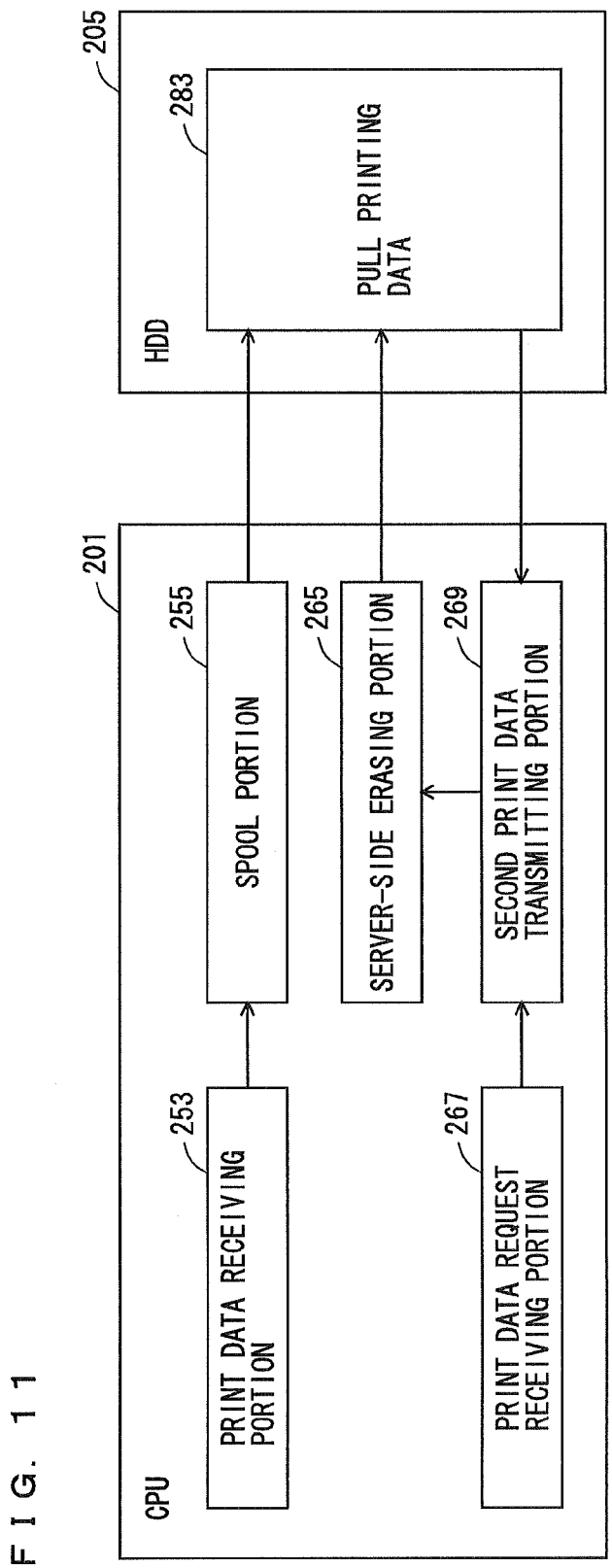
FIG. 11 is a block diagram showing exemplary functions of a CPU included in the print server according to a second embodiment of the present invention.

FIG. 11 is a block diagram showing exemplary functions of a CPU included in the print server according to the second embodiment. Referring to FIG. 11, this block diagram is different from the block diagram shown in FIG. 5 in that registration portion 251, virtual data transmitting portion 257, acquisition request receiving portion 259, and first print data transmitting portion 261 have been deleted. Therefore, in print server 200 according to the second embodiment, print data receiving portion 253 receives a set of print data and user identification information from one of PCs 400 to 402, and then spool portion 255 stores pull printing data including the received set of print data and user identification information into HDD 205.

When print data request receiving portion 267 receives a print data request from one of MFPs 100, 100A, and 100B, print data request receiving portion 267 outputs to second print data transmitting portion 269 the received print data request, and the device identification information of the device that issued the print data request. In the case where the print data that makes a pair with the user identification information included in the print data request input from print data request receiving portion 267 is stored in HDD 205, second print data transmitting portion 269 transmits a set of the print data and the user identification information to the device that issued the print data request. Further, when the transmission of the print data is finished, second print data transmitting portion 269 outputs an erase instruction including the print data identification information of the transmitted print data, to server-side erasing portion 265.

When server-side erasing portion 265 receives an erase instruction from second print data transmitting portion 269, server-side erasing portion 265 erases from HDD 205 pull printing data 283 including the print data that is specified by the print data identification information included in the erase instruction.

The functions of CPU 111 included in MFP 100B which is set to the pull printing mode are identical to those shown in FIG. 6, and thus, a description thereof will not be repeated here.

Figure 12:
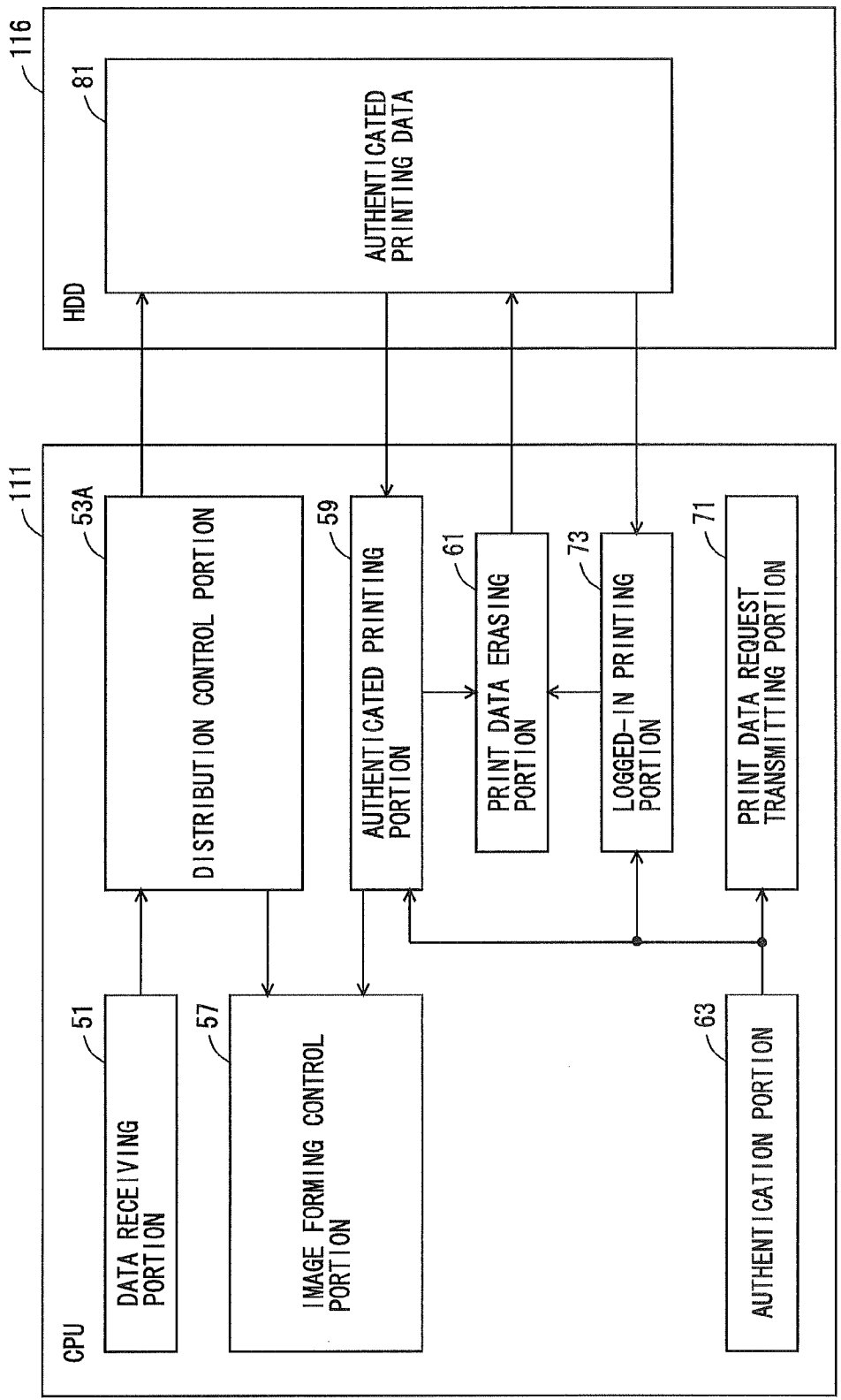
FIG. 12 is a block diagram showing exemplary functions of a CPU included in the MFP that is set to the multimode, according to the second embodiment.

FIG. 12 is a block diagram showing exemplary functions of a CPU included in the MFP that is set to the multimode, according to the second embodiment. The functions shown in FIG. 12 are formed in CPU 111 included in each of MFPs 100 and 100A set to the multimode, according to the second embodiment, as CPU 111 executes an image forming program for the multimode stored in ROM 113, HDD 116, or memory card 119A. The functions of CPUs 111 included in MFPs 100 and 100A set to the multimode are identical to each other, and thus, CPU 111 included in MFP 100 will be described representatively. Further, the functions identical to those shown in FIG. 7 are denoted by the same reference characters, and a description thereof will not be repeated here.

Referring to FIG. 12, CPU 111 included in MFP 100 according to the second embodiment includes: a data receiving portion 51; a distribution control portion 53A; an image forming control portion 57; an authenticated printing portion 59; a print data erasing portion 61; an authentication portion 63; a print data request transmitting portion 71; and a logged-in printing portion 73.

Data receiving portion 51 controls data communication control portion 117 to receive data from the outside. When data receiving portion 51 receives a set of print data and user identification information, data receiving portion 51 outputs the received set of print data and user identification information to distribution control portion 53A. The set of print data and user identification information may be transmitted from print server 200 that has received a print data request, or from PC 400, 401, or 402 that executes a printer driver program for authenticated printing. Further, when data receiving portion 51 receives print data transmitted from one of PCs 400 to 402, data receiving portion 51 outputs the received print data to distribution control portion 53A.

In the case where distribution control portion 53A receives print data from data receiving portion 51, distribution control portion 53A outputs the received print data to image forming control portion 57, so as to cause image forming portion 30 to print the print data. In the case where distribution control portion 53A receives a set of print data and user identification information from data receiving portion 51, distribution control portion 53A stores the received set of print data and user identification information as authenticated printing data 81 into HDD 116, without outputting the print data to image forming control portion 57.

When a user who operates MFP 100 is authenticated by authentication portion 63 and permitted to log in to MFP 100, authenticated printing portion 59 receives the user identification information of the logged-in user from authentication portion 63. In response to the event that the user identification information is input from authentication portion 63, in the case where the print data that makes a pair with the received user identification information is stored in HDD 116 at the time of the authentication of the user by authentication portion 63, authenticated printing portion 59 causes image forming control portion 57 to print the print data. Specifically, authenticated printing portion 59 uses the user identification information of the user authenticated by authentication portion 63 to search authenticated printing data 81 that are stored in HDD 116 at the time of the authentication of the user by authentication portion 63, for authenticated printing data 81 that includes the user identification information. If authenticated printing data 81 including the user identification information is extracted, authenticated printing portion 59 outputs the print data included in the extracted authenticated printing data 81 to image forming control portion 57. In the case where a plurality of pieces of authenticated printing data 81 including the user identification information are extracted, authenticated printing portion 59 outputs to image forming control portion 57 the plurality of pieces of print data included respectively in all the extracted pieces of authenticated printing data. Further, when the printing of the print data by image forming control portion 57 is finished, authenticated printing portion 59 outputs an erase instruction including the print data identification information for identifying the printed print data, to print data erasing portion 61.

When print data erasing portion 61 receives an erase instruction from authenticated printing portion 59, print data erasing portion 61 erases from HDD 116 authenticated printing data 81 including the print data that is specified by the print data identification information included in the erase instruction. This is for the purposes of preventing the same print data from being printed by a logged-in printing portion 73, which will be described later, and also preventing the same print data from being printed by authenticated printing portion 59 twice or more when the user logs in the second time or later.

When print data request transmitting portion 71 receives the user identification information of the logged-in user from authentication portion 63, print data request transmitting portion 71 transmits a print data request including the received user identification information to print server 200 via data communication control portion 117. The information about the destination of the print data request, which is exactly the device identification information of print server 200 here, is stored in HDD 116 by a user in advance when MFP 100 is set to the multimode.

As described previously, when print server 200 receives a print data request, in the case where the pull printing data including the user identification information that is included in the received print data request is contained in pull printing data 283 stored in HDD 205, print server 200 returns that print data and the user identification information.

Therefore, when data receiving portion 51 receives the set of print data and user identification information from print server 200, distribution control portion 53A stores the set of print data and user identification information as authenticated printing data 81 into HDD 116. At this point in time, the user has already logged in to MFP 100. Therefore, even if new authenticated printing data 81 including the user identification information of the logged-in user is stored in HDD 116, the print data included in the newly stored authenticated printing data 81 will not be printed by authenticated printing portion 59.

Logged-in printing portion 73 receives the user identification information of the logged-in user from authentication portion 63. Once the user identification information of the logged-in user is input from authentication portion 63, in the case where the print data that makes a pair with the user identification information of the logged-in user is stored in HDD 116, logged-in printing portion 73 causes image forming control portion 57 to print the print data, as long as the login of the logged-in user is valid. The period during which the login of the logged-in user is valid corresponds to the period from when authentication portion 63 succeeded in authentication until when a logout condition is satisfied. In the case where a predetermined key in operation portion 115 is pressed, or a predetermined time period has elapsed with no operation input into operation portion 115 by the user, the logout condition is satisfied.

More specifically, during the period in which the login of the logged-in user is valid, logged-in printing portion 73 uses the user identification information of the logged-in user to search authenticated printing data 81 stored in HDD 116 for authenticated printing data 81 that includes the user identification information. If authenticated printing data 81 including the user identification information is extracted as a result of the search, logged-in printing portion 73 outputs the print data included in the extracted authenticated printing data 81 to image forming control portion 57. In the case where a plurality of pieces of authenticated printing data 81 including the user identification information are extracted, logged-in printing portion 73 outputs to image forming control portion 57 the plurality of pieces of print data included respectively in all the extracted pieces of authenticated printing data. Further, when the printing of the print data by image forming control portion 57 is finished, logged-in printing portion 73 outputs an erase instruction including the print data identification information for identifying the printed print data, to print data erasing portion 61.

When print data erasing portion 61 receives an erase instruction from logged-in printing portion 73, print data erasing portion 61 erases from HDD 116 authenticated printing data 81 including the print data that is specified by the print data identification information included in the erase instruction. This is for the purposes of preventing the same print data from being printed by authenticated printing portion 59 twice or more in the case where the user logs in the second time or later.

Figure 13:
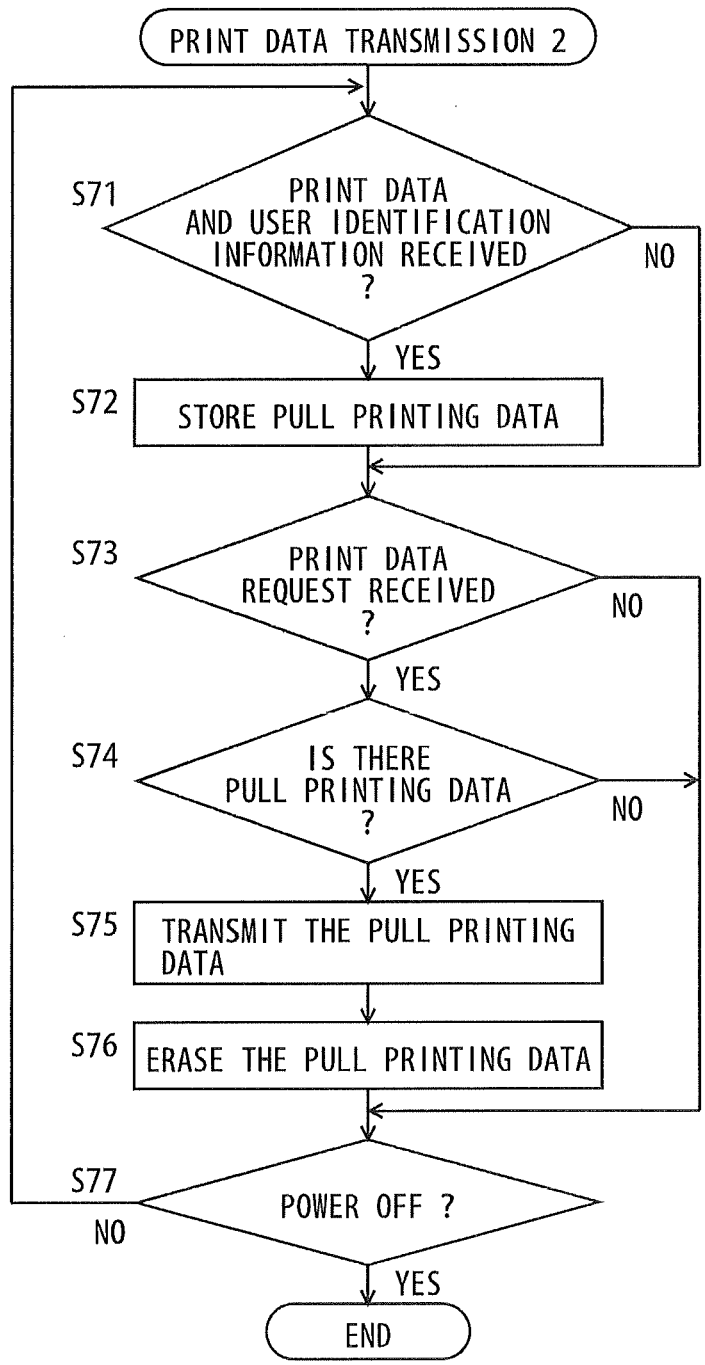
FIG. 13 is a flowchart illustrating an example of the flow of the print data transmitting process according to the second embodiment.

FIG. 13 is a flowchart illustrating an example of the flow of the print data transmitting process according to the second embodiment. The print data transmitting process is carried out by CPU 201 included in print server 200 according to the second embodiment as CPU 201 executes the print data transmitting program stored in ROM 202, HDD 205, or CD-ROM 209A.

Referring to FIG. 13, CPU 201 determines whether print data and user identification information have been received (step S71). If network I/F 204 receives print data and user identification information from one of PCs 400 to 402, the process proceeds to step S72; otherwise, the process proceeds to step S73. In step S72, CPU 201 stores pull printing data 283 including the print data and the user identification information into HDD 205.

In step S73, CPU 201 determines whether a print data request has been received. Specifically, CPU 201 determines whether network I/F 204 has received a print data request from one of MFPs 100, 100A, and 100B. If a print data request has been received, the process proceeds to step S74; otherwise, the process proceeds to step S77. In step S74, CPU 201 determines whether pull printing data 283 including the user identification information included in the received print data request is stored in HDD 205. If so, the process proceeds to step S75; otherwise, the process proceeds to step S77.

In step S75, CPU 201 extracts pull printing data 283 including the user identification information included in the print data request received in step S73, and transmits the print data included in the extracted pull printing data 283 to the one of MFPs 100, 100A, and 100B that issued the print data request. In step S76, CPU 201 erases from HDD 205 pull printing data 283 including the transmitted print data, and the process proceeds to step S77.

In step S77, CPU 201 determines whether main power supply has been turned off. If a user turns off a power supply switch included in operation portion 207, CPU 201 determines that the main power supply has been turned off. If the main power supply has been turned off, the process is terminated; otherwise, the process returns to step S71.

Figure 14:
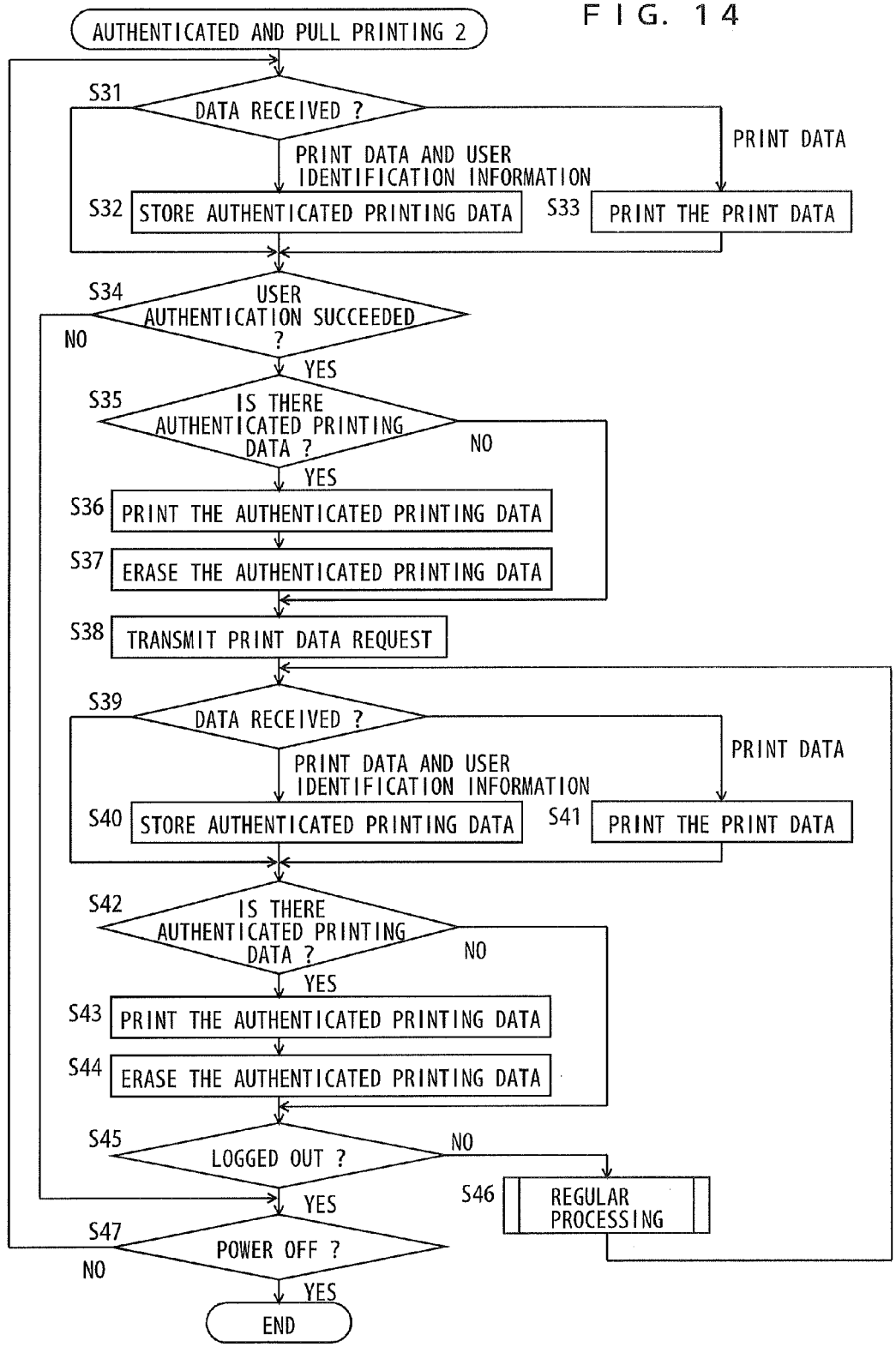
FIG. 14 is a flowchart illustrating an example of the flow of the authenticated and pull printing process according to the second embodiment.

FIG. 14 is a flowchart illustrating an example of the flow of the authenticated and pull printing process according to the second embodiment. The authenticated and pull printing process according to the second embodiment is carried out by CPU 111 included in each of MFPs 100 and 100A that are set to the multimode as CPU 111 executes the image forming program for the multimode stored in ROM 113, HDD 116, or memory card 119A. The processes performed by MFPs 100 and 100A are identical to each other. It is here assumed that CPU 111 included in MFP 100 executes the image forming program.

Referring to FIG. 14, CPU 111 included in MFP 100, which is set to the multimode, determines whether data has been received (step S31). If data communication control portion 117 receives data, the process branches in accordance with the received data, otherwise, the process proceeds to step S34. If the received data is a set of print data and user identification information, the process proceeds to step S32. If the received data is print data, the process proceeds to step S33. In step S32, CPU 111 stores authenticated printing data including the set of print data and user identification information into HDD 116, and the process proceeds to step S34. In step S33, CPU 111 prints the print data, and the process proceeds to step S34. For printing the print data, CPU 111 outputs the print data to image forming portion 30 to cause image forming portion 30 to form an image of the print data.

In step S34, CPU 111 determines whether a user authentication has succeeded. Specifically, CPU 111 accepts user identification information and a password input from a user who operates MFP 100, and requests authentication server 300 to authenticate the user. If CPU 111 receives an authentication result indicating that the authentication has succeeded from authentication server 300, CPU 111 determines that the authentication has succeeded. If the user authentication has succeeded, the process proceeds to step S35; otherwise, the process proceeds to step S47.

In step S35, CPU 111 determines whether authenticated printing data 81 stored in HDD 116 contains therein authenticated printing data 81 that includes the user identification information of the user authenticated in step S34. If so, the process proceeds to step S36; otherwise, the process proceeds to step S38. In step S36, CPU 111 prints the print data that is included in authenticated printing data 81 including the user identification information of the authenticated user, and the process proceeds to step S37. In step S37, CPU 111 erases authenticated printing data 81 including the printed print data from HDD 116, and the process proceeds to step S38.

In step S38, CPU 111 transmits a print data request to print server 200. The print data request includes the user identification information of the user authenticated in step S34. In the following step S39, CPU 111 determines whether data has been received. If data communication control portion 117 receives data, the process branches in accordance with the received data, otherwise, the process proceeds to step S42. If the received data is a set of print data and user identification information, the process proceeds to step S40. If the received data is print data, the process proceeds to step S41. In step S40, CPU 111 stores authenticated printing data 81 including the set of print data and user identification information into HDD 116, and the process proceeds to step S42. In step S41, CPU 111 prints the print data, and the process proceeds to step S42.

In step S42, CPU 111 determines whether authenticated printing data 81 stored in HDD 116 contains therein authenticated printing data 81 including the user identification information of the user authenticated in step S34. If so, the process proceeds to step S43; otherwise, the process proceeds to step S45. In step S43, CPU 111 prints the print data that is included in authenticated printing data 81 including the user identification information of the authenticated user, and the process proceeds to step S44. In step S44, CPU 111 erases authenticated printing data 81 including the printed print data from HDD 116, and the process proceeds to step S45.

In step S45, CPU 111 determines whether a logout condition has been satisfied. If so, the process proceeds to step S47; otherwise, the process proceeds to step S46. In step S46, CPU 111 executes regular processing, and the process returns to step S39. After the regular processing is executed, the process returns to step S39. Therefore, when a set of print data and user identification information is received from print server 200 during or after the regular processing, the received set of print data and user identification information is stored as new authenticated printing data 81 into HDD 116. Thereafter, when step S43 is executed, the print data included in authenticated printing data 81 newly stored in HDD 116 after the login of the logged-in user is printed.

In step S47, CPU 111 determines whether main power supply has been turned off. If the main power supply has been turned off, the process is terminated; otherwise, the process returns to step S31.

As described above, in printing system 1 of the second embodiment, in the case where MFP 100 which is set to the multimode receives a set of print data and user identification information from one of PCs 400 to 402 or print server 200, MFP 100 stores the set of print data and user identification information as authenticated printing data 81 into HDD 116, without printing the print data. When a user is authenticated, MFP 100 prints the print data included in authenticated printing data 81 that is stored in HDD 116 at the time of the authentication of the user and that includes the user identification information of the authenticated user, and then erases that authenticated printing data 81 including the printed print data from HDD 116. Further, when the user is authenticated, MFP 100 transmits a print data request including the user identification information of the authenticated user to print server 200. When print server 200 that has received the print data request returns pull printing data 283 stored in HDD 205, MFP 100 receives the pull printing data 283, and stores the same as authenticated printing data 81 into HDD 116, without printing the print data included in the received pull printing data. In the case where authenticated printing data 81 is stored into HDD 116 while the login of the authenticated user is valid, MFP 100 prints the print data included in the authenticated printing data 81 and erases the printed print data. Accordingly, MFP 100 which is set to the multimode is able to print the print data included in authenticated printing data 81 stored in HDD 116, as well as the print data included in pull printing data 283 stored in HDD 205 in print server 200, at the time when a user is authenticated.

While printing system 1 has been described in the above embodiments, the present invention may of course be understood as a printing method or a printing program for causing print server 200 to execute the processing shown in FIG. 8, causing MFP 100B which is set to the pull printing mode to execute the processing shown in FIG. 9, and causing MFPs 100 and 100A which are set to the multimode to execute the processing shown in FIG. 10. The present invention may also be understood as a printing method or a printing program for causing print server 200 to execute the processing shown in FIG. 13, causing MFP 100B which is set to the pull printing mode to execute the processing shown in FIG. 9, and causing MFPs 100 and 100A which are set to the multimode to execute the processing shown in FIG. 14.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

Appendix (1) A printing system including first and second image forming apparatuses and a print server,
said print server comprising:
a registration portion configured to register said first image forming apparatus;
a spool portion configured to, in the case where a set of print data and user identification information is received from the outside, store said received set of print data and user identification information into a server-side storing portion;
a virtual data transmitting portion configured to, in response to an event that said set of print data and user identification information is stored into said server-side storing portion, transmit virtual data to said registered first image forming apparatus, the virtual data including at least print data identification information for identifying said stored print data and said user identification information making a pair with said stored print data;
a first print data transmitting portion configured to, in response to an event that an acquisition request including said print data identification information is received from said first image forming apparatus, in the case where print data specified by said print data identification information is stored in said server-side storing portion, transmit the print data to said first image forming apparatus; and
a second print data transmitting portion configured to, in response to an event that a print data request is received from said second image forming apparatus, in the case where print data that makes a pair with the user identification information included in said received print data request is stored in said server-side storing portion, transmit the print data to said second image forming apparatus,
said first and second image forming apparatuses each comprising:
an authentication portion configured to authenticate a user;
a print data receiving portion configured to receive print data from the outside; and
an image forming portion configured to form an image of print data received from the outside,
said first image forming apparatus further comprising:
a distribution control portion configured to, in the case where print data is received from the outside, cause said image forming portion to form an image of said received print data, and, in the case where a set of print data and user identification information is received from the outside, store said received set of print data and user identification information into an authenticated printing data storing portion, while prohibiting said image forming portion from forming an image of said received print data, and further, in the case where said virtual data is received from said print server, store the received virtual data into said authenticated printing data storing portion;
an authenticated printing portion configured to, in response to an event that a user is authenticated by said authentication portion, cause said image forming portion to form an image of print data that is stored in said authenticated printing data storing portion at the time of the authentication of the user by said authentication portion and that makes a pair with the user identification information of said authenticated user; and
an acquisition request transmitting portion configured to, in the case where said virtual data including the user identification information of said authenticated user is stored in said authenticated printing data storing portion at the time of the authentication of the user by said authentication portion, transmit an acquisition request including the print data identification information included in the virtual data to said print server,
said second image forming apparatus further comprising a print data request transmitting portion configured to, in response to an event that a user is authenticated by said authentication portion, transmit a print data request including the user identification information of said authenticated user to said print server.

(2) The printing system according to (1) above, wherein
said print server further comprises a server-side erasing portion configured to, in the case where said print data is transmitted by said first or second print data transmitting portion, erase the transmitted print data from said server-side storing portion, and
said first print data transmitting portion includes a dummy signal transmitting portion configured to, in the case where said acquisition request is received from said first image forming apparatus, if no print data specified by the print data identification information included in the acquisition request is stored in said server-side storing portion, transmit a dummy signal to said first image forming apparatus, the dummy signal including the print data identification information included in said acquisition request and indicating that the print data has already been printed.

(3) A printing system including first and second image forming apparatuses and a print server, said print server comprising:

a spool portion configured to, in the case where a set of print data and user identification information is received from the outside, store said received set of print data and user identification information into a server-side storing portion; and a print data transmitting portion configured to, in response to an event that a print data request is received from said first or second image forming apparatus, in the case where print data that makes a pair with the user identification information included in said received print data request is stored in said server-side storing portion, transmit a set of the print data and said user identification information to the one of said first and second image forming apparatuses that issued said print data request, said first and second image forming apparatuses each comprising:

an authentication portion configured to authenticate a user;

a print data requesting portion configured to, in response to an event that a user is authenticated by said authentication portion, transmit a print data request including the user identification information of said authenticated user to said print server;

a print data receiving portion configured to receive print data from the outside; and an image forming portion configured to form an image of print data received from the outside, said first image forming apparatus further comprising:

a distribution control portion configured to, in the case where print data is received from the outside, cause said image forming portion to form an image of said received print data, and, in the case where a set of print data and user identification information is received from the outside, store said received set of print data and user identification information into an authenticated printing data storing portion, while prohibiting said image forming portion from forming an image of said received print data;

an authenticated printing portion configured to, in response to an event that a user is authenticated by said authentication portion, cause said image forming portion to form an image of print data that is stored in said authenticated printing data storing portion at the time of the authentication of the user by said authentication portion and that makes a pair with the user identification information of said authenticated user;

a print data erasing portion configured to, after an image of said print data is formed by said image forming portion, erase said print data, the image of which has been formed, from said authenticated printing data storing portion; and a logged-in printing portion configured to, in the case where print data that makes a pair with the user identification information of said authenticated user is stored in said authenticated printing data storing portion during a period in which the login of the user authenticated by said authentication portion is valid, cause said image forming portion to form an image of the print data.

(4) A print server capable of communicating with first and second image forming apparatuses, the print server comprising:

a registration portion configured to register said first image forming apparatus;

a spool portion configured to, in the case where a set of print data and user identification information is received from the outside, store said received set of print data and user identification information into a server-side storing portion;

a virtual data transmitting portion configured to, in response to an event that said set of print data and user identification information is stored into said server-side storing portion, transmit virtual data to said registered first image forming apparatus, the virtual data including at least print data identification information for identifying said stored print data and said user identification information making a pair with said stored print data;

a first print data transmitting portion configured to, in response to an event that an acquisition request including said print data identification information is received from said first image forming apparatus, in the case where print data specified by said print data identification information is stored in said server-side storing portion, transmit the print data to said first image forming apparatus; and a second print data transmitting portion configured to, in response to an event that a print data request is received from said second image forming apparatus, in the case where print data that makes a pair with the user identification information included in said received print data request is stored in said server-side storing portion, transmit the print data to said second image forming apparatus.

According to this aspect, the first image forming apparatus is registered, a set of print data and user identification information received from the outside is stored, and virtual data including at least the print data identification information for identifying the stored print data and the user identification information is transmitted to the first image forming apparatus. When an acquisition request including the print data identification information is received from the first image forming apparatus, the print data specified by the print data identification information is transmitted to the first image forming apparatus. When a print data request is received from the second image forming apparatus, the print data that makes a pair with the user identification information included in the print data request is transmitted to the second image forming apparatus. Accordingly, it is possible to cause the registered first image forming apparatus to print the print data only in the case where the acquisition request is received. Even in the case where the first image forming apparatus cannot transmit a print data request with a single time of user authentication, it is possible to cause the first image forming apparatus to print the print data. As a result, it is possible to provide a print server which can cause an image forming apparatus that cannot transmit a print data request with a single time of user authentication, to print the print data.

(5) The print server according to (4) above, further comprising a server-side erasing portion configured to, in the case where said print data is transmitted by said first or second print data transmitting portion, erase the transmitted print data from said server-side storing portion, wherein said first print data transmitting portion includes a dummy signal transmitting portion configured to, in the case where said acquisition request is received from said first image forming apparatus, if no print data specified by the print data identification information included in the acquisition request is stored in said server-side storing portion, transmit a dummy signal to said first image forming apparatus, the dummy signal including the print data identification information included in said received acquisition request and indicating that the print data has already been printed.

(6) A print data transmitting method performed by a print server capable of communicating with first and second image forming apparatuses, the method comprising:

a registration step of registering said first image forming apparatus;

a spool step of, in the case where a set of print data and user identification information is received from the outside, storing said received set of print data and user identification information into a server-side storing portion;

a virtual data transmitting step of, in response to an event that said set of print data and user identification information is stored into said server-side storing portion, transmitting virtual data to said registered first image forming apparatus, the virtual data including at least print data identification information for identifying said stored print data and said user identification information making a pair with said stored print data;

a first print data transmitting step of, in response to an event that an acquisition request including said print data identification information is received from said first image forming apparatus, in the case where print data specified by said print data identification information is stored in said server-side storing portion, transmitting the print data to said first image forming apparatus; and a second print data transmitting step of, in response to an event that a print data request is received from said second image forming apparatus, in the case where print data that makes a pair with the user identification information included in said received print data request is stored in said server-side storing portion, transmitting the print data to said second image forming apparatus.

(7) A print data transmitting program performed by a computer, the computer being configured to control a print server capable of communicating with first and second image forming apparatuses, the program causing said computer to execute processing comprising:

a registration step of registering said first image forming apparatus;

a spool step of, in the case where a set of print data and user identification information is received from the outside, storing said received set of print data and user identification information into a server-side storing portion;

a virtual data transmitting step of, in response to an event that said set of print data and user identification information is stored into said server-side storing portion, transmitting virtual data to said registered first image forming apparatus, the virtual data including at least print data identification information for identifying said stored print data and said user identification information making a pair with said stored print data;

a first print data transmitting step of, in response to an event that an acquisition request including said print data identification information is received from said first image forming apparatus, in the case where print data specified by said print data identification information is stored in said server-side storing portion, transmitting the print data to said first image forming apparatus; and a second print data transmitting step of, in response to an event that a print data request is received from said second image forming apparatus, in the case where print data that makes a pair with the user identification information included in said received print data request is stored in said server-side storing portion, transmitting the print data to said second image forming apparatus.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A printing system including an image forming apparatus and a print server, said print server comprising:

a registration portion configured to register said image forming apparatus;

a spool portion configured to, in the case where a set of print data and user identification information is received from the outside, store said received set of print data and user identification information into a server-side storing portion;

a virtual data transmitting portion configured to, in response to an event that said set of print data and user identification information is stored into said server-side storing portion, transmit virtual data to said registered image forming apparatus, the virtual data including at least print data identification information for identifying said stored print data and said user identification information making a pair with said stored print data; and a print data transmitting portion configured to, in response to an event that an acquisition request including said print data identification information is received from said registered image forming apparatus, in the case where print data specified by said print data identification information is stored in said server-side storing portion, transmit the print data to said image forming apparatus that issued said acquisition request, said registered image forming apparatus comprising:

an authentication portion configured to authenticate a user;

a print data receiving portion configured to receive print data from the outside;

an image forming portion configured to form an image of print data received from the outside;

a distribution control portion configured to, in the case where print data is received from the outside, cause said image forming portion to form an image of said received print data, and, in the case where a set of print data and user identification information is received from the outside, store said received set of print data and user identification information into an authenticated printing data storing portion, while prohibiting said image forming portion from forming an image of said received print data, and further, in the case where said virtual data is received from said print server, store the received virtual data into said authenticated printing data storing portion;

an authenticated printing portion configured to, in response to an event that a user is authenticated by said authentication portion, cause said image forming portion to form an image of print data that is stored in said authenticated printing data storing portion at the time of the authentication of the user by said authentication portion and that makes a pair with the user identification information of said authenticated user; and an acquisition request transmitting portion configured to, in the case where said virtual data including the user identification information of said authenticated user is stored in said authenticated printing data storing portion at the time of the authentication of the user by said authentication portion, transmit an acquisition request including the print data identification information included in the virtual data to said print server.

2. The printing system according to claim 1, wherein said print server further comprises a server-side erasing portion configured to, in the case where said print data is transmitted by said print data transmitting portion, erase the transmitted print data from said server-side storing portion, and said print data transmitting portion includes a dummy signal transmitting portion configured to, in the case where said acquisition request is received from said image forming apparatus, if no print data specified by the print data identification information included in the acquisition request is stored in said server-side storing portion, transmit a dummy signal to said image forming apparatus, the dummy signal including the print data identification information included in said acquisition request and indicating that the print data has already been printed.

3. The printing system according to claim 2, wherein said distribution control portion includes a virtual data erasing portion configured to, in the case where said dummy signal is received from said print server, erase said virtual data that is stored in said authenticated printing data storing portion and that includes the print data identification information included in said received dummy signal from said authenticated printing data storing portion.

4. The printing system according to claim 1, wherein said image forming apparatus further comprises a print data erasing portion configured to, after an image of said print data is formed by said image forming portion, erase said print data, the image of which has been formed, from said authenticated printing data storing portion.

5. An image forming apparatus capable of communicating with a print server,
    said print server including
        a registration portion configured to register said image forming apparatus,
        a spool portion configured to, in the case where a set of print data and user identification information is received from the outside, store said received set of print data and user identification information into a server-side storing portion,
        a virtual data transmitting portion configured to, in response to an event that said set of print data and user identification information is stored into said server-side storing portion, transmit virtual data to said registered image forming apparatus, the virtual data including at least print data identification information for identifying said stored print data and said user identification information making a pair with said stored print data, and
        a print data transmitting portion configured to, in response to an event that an acquisition request including said print data identification information is received from said registered image forming apparatus, in the case where print data specified by said print data identification information is stored in said server-side storing portion, transmit the print data to said image forming apparatus that issued said acquisition request,
    the image forming apparatus comprising:
    an authentication portion configured to authenticate a user;
    a print data receiving portion configured to receive print data from the outside;
    an image forming portion configured to form an image of print data;
    a distribution control portion configured to, in the case where print data is received from the outside, cause said image forming portion to form an image of said received print data, and, in the case where a set of print data and user identification information is received from the outside, store said received set of print data and user identification information into an authenticated printing data storing portion, while prohibiting said image forming portion from forming an image of said received print data, and further, in the case where said virtual data is received from said print server, store the received virtual data into said authenticated printing data storing portion;
    an authenticated printing portion configured to, in response to an event that a user is authenticated by said authentication portion, cause said image forming portion to form an image of print data that is stored in said authenticated printing data storing portion at the time of the authentication of the user by said authentication portion and that makes a pair with the user identification information of said authenticated user; and
    an acquisition request transmitting portion configured to, in the case where said virtual data including the user identification information of said authenticated user is stored in said authenticated printing data storing portion at the time of the authentication of the user by said authentication portion, transmit an acquisition request including the print data identification information included in the virtual data to said print server.

6. The image forming apparatus according to claim 5, wherein said distribution control portion includes a virtual data erasing portion configured to, in the case where a dummy signal is received from said print server in response to the transmission of said acquisition request to said print server, erase said virtual data that is stored in said authenticated printing data storing portion and that includes the print data identification information included in said received dummy signal from said authenticated printing data storing portion.

7. The image forming apparatus according to claim 5, further comprising a print data erasing portion configured to, after an image of said print data is formed by said image forming portion, erase said print data, the image of which has been formed, from said authenticated printing data storing portion.

8. An image forming method performed by an image forming apparatus capable of communicating with a print server,
    said print server including
        a registration portion configured to register said image forming apparatus,
        a spool portion configured to, in the case where a set of print data and user identification information is received from the outside, store said received set of print data and user identification information into a server-side storing portion,
        a virtual data transmitting portion configured to, in response to an event that said set of print data and user identification information is stored into said server-side storing portion, transmit virtual data to said registered image forming apparatus, the virtual data including at least print data identification information for identifying said stored print data and said user identification information making a pair with said stored print data, and
        a print data transmitting portion configured to, in response to an event that an acquisition request including said print data identification information is received from said registered image forming apparatus, in the case where print data specified by said print data identification information is stored in said server-side storing portion, transmit the print data to said image forming apparatus that issued said acquisition request,
    said image forming apparatus including
        an authenticated printing data storing portion configured to store data, and an image forming portion configured to form an image of print data received from the outside, the method comprising:

an authentication step of authenticating a user;

a distribution controlling step of, in the case where print data is received from the outside, causing said image forming portion to form an image of said received print data, and, in the case where a set of print data and user identification information is received from the outside, storing said received set of print data and user identification information into said authenticated printing data storing portion, while prohibiting said image forming portion from forming an image of said received print data, and further, in the case where said virtual data is received from said print server, storing the received virtual data into said authenticated printing data storing portion;

an authenticated printing step of, in response to an event that a user is authenticated in said authentication step, causing said image forming portion to form an image of print data that is stored in said authenticated printing data storing portion at the time of the authentication of the user in said authentication step and that makes a pair with the user identification information of said authenticated user; and an acquisition requesting step of, in the case where said virtual data including the user identification information of said authenticated user is stored in said authenticated printing data storing portion at the time of the authentication of the user in said authentication step, transmitting an acquisition request including the print data identification information included in the virtual data to said print server.

9. A non-transitory computer-readable recording medium encoded with an image forming program performed by a computer, the computer being configured to control an image forming apparatus capable of communicating with a print server, said print server including
a registration portion configured to register said image forming apparatus,
a spool portion configured to, in the case where a set of print data and user identification information is received from the outside, store said received set of print data and user identification information into a server-side storing portion,
a virtual data transmitting portion configured to, in response to an event that said set of print data and user identification information is stored into said server-side storing portion, transmit virtual data to said registered image forming apparatus, the virtual data including at least print data identification information for identifying said stored print data and said user identification information making a pair with said stored print data, and
a print data transmitting portion configured to, in response to an event that an acquisition request including said print data identification information is received from said registered image forming apparatus, in the case where print data specified by said print data identification information is stored in said server-side storing portion, transmit the print data to said image forming apparatus that issued said acquisition request, said image forming apparatus including
an authenticated printing data storing portion configured to store data, and an image forming portion configured to form an image of print data received from the outside, the program causing said computer to execute processing comprising:

an authentication step of authenticating a user;

a distribution controlling step of, in the case where print data is received from the outside, causing said image forming portion to form an image of said received print data, and, in the case where a set of print data and user identification information is received from the outside, storing said received set of print data and user identification information into said authenticated printing data storing portion, while prohibiting said image forming portion from forming an image of said received print data, and further, in the case where said virtual data is received from said print server, storing the received virtual data into said authenticated printing data storing portion;

an authenticated printing step of, in response to an event that a user is authenticated in said authentication step, causing said image forming portion to form an image of print data that is stored in said authenticated printing data storing portion at the time of the authentication of the user in said authentication step and that makes a pair with the user identification information of said authenticated user; and an acquisition requesting step of, in the case where said virtual data including the user identification information of said authenticated user is stored in said authenticated printing data storing portion at the time of the authentication of the user in said authentication step, transmitting an acquisition request including the print data identification information included in the virtual data to said print server.

10. A printing system including an image forming apparatus and a print server, said print server comprising:
a spool portion configured to, in the case where a set of print data and user identification information is received from the outside, store said received set of print data and user identification information into a server-side storing portion; and
a print data transmitting portion configured to, in response to an event that a print data request is received from said image forming apparatus, in the case where print data that makes a pair with the user identification information included in said received print data request is stored in said server-side storing portion, transmit a set of the print data and said user identification information to said image forming apparatus that issued said print data request, said image forming apparatus comprising:
an authentication portion configured to authenticate a user;
a print data requesting portion configured to, in response to an event that a user is authenticated by said authentication portion, transmit a print data request including the user identification information of said authenticated user to said print server;
a print data receiving portion configured to receive print data from the outside;
an image forming portion configured to form an image of print data received from the outside;
a distribution control portion configured to, in the case where print data is received from the outside, cause said image forming portion to form an image of said received print data, and, in the case where a set of print data and user identification information is received from the outside, store said received set of print data and user identification information into an authenticated printing data storing portion, while prohibiting said image forming portion from forming an image of said received print data;

an authenticated printing portion configured to, in response to an event that a user is authenticated by said authentication portion, cause said image forming portion to form an image of print data that is stored in said authenticated printing data storing portion at the time of the authentication of the user by said authentication portion and that makes a pair with the user identification information of said authenticated user;

a print data erasing portion configured to, after an image of said print data is formed by said image forming portion, erase said print data, the image of which has been formed, from said authenticated printing data storing portion; and a logged-in printing portion configured to, in the case where print data that makes a pair with the user identification information of said authenticated user is stored in said authenticated printing data storing portion during a period in which the login of the user authenticated by said authentication portion is valid, cause said image forming portion to form an image of the print data.

11. The printing system according to claim 10, wherein said print server further comprises a server-side print data erasing portion configured to erase from said server-side storing portion the print data transmitted by said print data transmitting portion.

12. An image forming apparatus capable of communicating with a print server, said print server including
- a spool portion configured to, in the case where a set of print data and user identification information is received from the outside, store said received set of print data and user identification information into a server-side storing portion, and
- a print data transmitting portion configured to, in response to an event that a print data request is received from said image forming apparatus, in the case where print data that makes a pair with the user identification information included in said received print data request is stored in said server-side storing portion, transmit a set of the print data and said user identification information to the image forming apparatus that issued said print data request, the image forming apparatus comprising:

an authentication portion configured to authenticate a user;

a print data receiving portion configured to receive print data from the outside;

an image forming portion configured to form an image;

a distribution control portion configured to, in the case where print data is received from the outside, cause said image forming portion to form an image of said received print data, and, in the case where a set of print data and user identification information is received from the outside, store said received set of print data and user identification information into an authenticated printing data storing portion, while prohibiting said image forming portion from forming an image of said received print data;

an authenticated printing portion configured to, in response to an event that a user is authenticated by said authentication portion, cause said image forming portion to form an image of print data that is stored in said authenticated printing data storing portion at the time of the authentication of the user by said authentication portion and that makes a pair with the user identification information of said authenticated user;

a print data erasing portion configured to, after an image of said print data is formed by said image forming portion, erase said print data, the image of which has been formed, from said authenticated printing data storing portion; and a logged-in printing portion configured to, in the case where print data that makes a pair with the user identification information of said authenticated user is stored in said authenticated printing data storing portion during a period in which the login of the user authenticated by said authentication portion is valid, cause said image forming portion to form an image of the print data.

13. An image forming method performed by an image forming apparatus capable of communicating with a print server, said print server including
- a spool portion configured to, in the case where a set of print data and user identification information is received from the outside, store said received set of print data and user identification information into a server-side storing portion, and
- a print data transmitting portion configured to, in response to an event that a print data request is received from said image forming apparatus, in the case where print data that makes a pair with the user identification information included in said received print data request is stored in said server-side storing portion, transmit a set of the print data and said user identification information to the image forming apparatus that issued said print data request, said image forming apparatus including
- an authenticated printing data storing portion configured to store data, and
- an image forming portion configured to form an image, the method comprising:

an authentication step of authenticating a user;

a print data receiving step of receiving print data from the outside;

a distribution controlling step of, in the case where print data is received from the outside, causing said image forming portion to form an image of said received print data, and, in the case where a set of print data and user identification information is received from the outside, storing said received set of print data and user identification information into said authenticated printing data storing portion, while prohibiting said image forming portion from forming an image of said received print data;

an authenticated printing step of, in response to an event that a user is authenticated in said authentication step, causing said image forming portion to form an image of print data that is stored in said authenticated printing data storing portion at the time of the authentication of the user in said authentication step and that makes a pair with the user identification information of said authenticated user;

a print data erasing step of, after an image of said print data is formed by said image forming portion in said authenticated printing step, erasing said print data, the image of which has been formed, from said authenticated printing data storing portion; and a logged-in printing step of, in the case where print data that makes a pair with the user identification information of said authenticated user is stored in said authenticated printing data storing portion during a period in which the login of the user authenticated in said authentication step is valid, causing said image forming portion to form an image of the print data.

14. A non-transitory computer-readable recording medium encoded with an image forming program performed by a computer, the computer being configured to control an image forming apparatus capable of communicating with a print server, said print server including
  a spool portion configured to, in the case where a set of print data and user identification information is received from the outside, store said received set of print data and user identification information into a server-side storing portion, and
  a print data transmitting portion configured to, in response to an event that a print data request is received from said image forming apparatus, in the case where print data that makes a pair with the user identification information included in said received print data request is stored in said server-side storing portion, transmit a set of the print data and said user identification information to the image forming apparatus that issued said print data request, said image forming apparatus including
  an authenticated printing data storing portion configured to store data, and
  an image forming portion configured to form an image, the program causing said computer to execute processing comprising:

an authentication step of authenticating a user;

a print data receiving step of receiving print data from the outside;

a distribution controlling step of, in the case where print data is received from the outside, causing said image forming portion to form an image of said received print data, and, in the case where a set of print data and user identification information is received from the outside, storing said received set of print data and user identification information into said authenticated printing data storing portion, while prohibiting said image forming portion from forming an image of said received print data;

an authenticated printing step of, in response to an event that a user is authenticated in said authentication step, causing said image forming portion to form an image of print data that is stored in said authenticated printing data storing portion at the time of the authentication of the user in said authentication step and that makes a pair with the user identification information of said authenticated user;

a print data erasing step of, after an image of said print data is formed by said image forming portion in said authenticated printing step, erasing said print data, the image of which has been formed, from said authenticated printing data storing portion; and a logged-in printing step of, in the case where print data that makes a pair with the user identification information of said authenticated user is stored in said authenticated printing data storing portion during a period in which the login of the user authenticated in said authentication step is valid, causing said image forming portion to form an image of the print data.

* * * * *